United States Patent
Miyairi et al.

(10) Patent No.: US 11,421,570 B2
(45) Date of Patent: Aug. 23, 2022

(54) PARTICULATE FILTER AND CANNING STRUCTURE

(71) Applicant: NGK INSULATORS, LTD., Nagoya (JP)

(72) Inventors: Yukio Miyairi, Nagoya (JP); Takahiro Tomita, Nagoya (JP); Megumi Fujisaki, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 226 days.

(21) Appl. No.: 16/812,705

(22) Filed: Mar. 9, 2020

(65) Prior Publication Data
US 2020/0309002 A1 Oct. 1, 2020

(30) Foreign Application Priority Data

Mar. 29, 2019 (JP) .............................. JP2019-069415

(51) Int. Cl.
| | |
|---|---|
| *F01N 3/022* | (2006.01) |
| *F01N 13/18* | (2010.01) |
| *F01N 3/021* | (2006.01) |
| *F01N 3/023* | (2006.01) |
| *F01N 3/035* | (2006.01) |
| *B01D 46/24* | (2006.01) |
| *B01D 46/84* | (2022.01) |

(52) U.S. Cl.
CPC ....... *F01N 3/0222* (2013.01); *B01D 46/2422* (2013.01); *B01D 46/2429* (2013.01); *B01D 46/84* (2022.01); *F01N 3/023* (2013.01); *F01N 3/0211* (2013.01); *F01N 3/035* (2013.01); *F01N 13/1811* (2013.01); *B01D 2279/30* (2013.01); *F01N 2330/06* (2013.01); *F01N 2330/30* (2013.01)

(58) Field of Classification Search
CPC .... F01N 3/022; F01N 4/2011; F01N 2330/06; F01N 2350/02; B01D 46/2422; B01D 46/24491
USPC ..................... 422/179, 180; 55/523; 428/116
See application file for complete search history.

(56) References Cited

U.S. PATENT DOCUMENTS

| | | | | |
|---|---|---|---|---|
| 2004/0161373 | A1* | 8/2004 | Ichikawa | C04B 38/008 422/180 |
| 2006/0210764 | A1* | 9/2006 | Yamada | C04B 41/009 428/116 |
| 2009/0060800 | A1* | 3/2009 | Fernandes, Jr. | F01N 3/2857 422/168 |

FOREIGN PATENT DOCUMENTS

| | | |
|---|---|---|
| JP | 2002070529 A * | 3/2002 |
| JP | 2008-057333 A1 | 3/2008 |
| JP | 2010-116913 A1 | 5/2010 |

* cited by examiner

*Primary Examiner* — Tom P Duong
(74) *Attorney, Agent, or Firm* — Burr & Brown, PLLC

(57) ABSTRACT

A particulate filter, including: a pillar-shaped honeycomb structure portion having a plurality of first cells extending from a first end face to a second end face, the first end face being open and the second end face being plugged, and a plurality of second cells extending from the first end face to the second end face, the first end face being plugged and the second end face being open, in which the first cells and the second cells are alternately arranged adjacent to each other with porous partition walls interposed therebetween; and a low thermal conductive layer covering a part or the whole of an outer peripheral side surface of the pillar-shaped honeycomb structure portion, the thermal conductivity in a thickness direction of the low thermal conductive layer being 0.6 W/(m·K) or less.

15 Claims, 9 Drawing Sheets

PARTICULATE FILTER AND CANNING STRUCTURE

FIELD OF THE INVENTION

The present invention relates to a particulate filter. Further, the present invention relates to a canning structure.

BACKGROUND OF THE INVENTION

Particulate matter (hereinafter referred to as PM) in exhaust gas discharged from internal combustion engines such as diesel engines and gasoline engines includes soot. Soot is harmful to the human body and its emission is regulated. Currently, in order to comply with exhaust gas regulations, particulate filters typified by DPF and GPF, which filtrate PM such as soot and the like by passing the exhaust gas through small pore partition walls having air permeability, are widely used.

Conventionally, a particulate filter comprising a wall flow type cylindrical honeycomb structure portion, in which a plurality of cells extending from one end face to the other end face and are alternately plugged, is known. In such a particulate filter, when soot is deposited at a certain value or more, the temperature of the exhaust gas is raised, and the filter is regenerated by flowing high-temperature exhaust gas through the filter to burn off the soot, so that the pressure loss is prevented from being excessive.

In the regeneration of the filter, it is necessary to burn off the soot deposited on the filter. However, it takes a long time to burn the soot, and it is necessary to use extra fuel to raise the exhaust gas temperature. Therefore, in the filter regeneration, there is a problem that the consumption of fuel for continuously raising the gas temperature becomes too much. In addition, since the temperature of the exhaust gas is high during the regeneration of the filter, ammonia is oxidized and the $NO_x$ purification efficiency by the urea SCR is greatly impaired, causing a problem that the $NO_x$ emission increases.

Further, as a method of raising the temperature of the exhaust gas, a method of performing post injection of injecting fuel into the combustion chamber after the latter stage of combustion in the combustion chamber, and burning this fuel with an oxidation catalyst prior to the particulate filter to raise the gas temperature, is generally known. If the filter regeneration time is long, part of the post injection fuel mixes with the lubricating oil, diluting the lubricating oil, causing a problem that the lubricity is deteriorated and wearing of components occurs. Further, there is also a problem that the soot accumulation amount becomes maximum immediately before the regeneration, and the pressure loss becomes too much. Therefore, when generating a filter, it is desired to burn off a large amount of soot in a short time at a temperature as low as possible.

Japanese Patent Publication No. 2008-057333 (Patent Literature 1) describes a DPF regeneration processing device for a vehicle, capable of improving the effective operability of a diesel engine by shortening the automatic regeneration time of a DPF in a vehicle equipped with a diesel engine. According to this device, it is described that the temperature of the DPF is lower than before, but the concentration of oxygen introduced into the DPF increases, and moreover the exhaust gas flow rate decreases. As a result, the probability of contact between the PM on the DPF filter and the oxygen in the exhaust gas increases, and the combustion of the PM on the filter is activated, and the burning off of the PM proceeds rapidly, and the automatic regeneration time of PM can be shortened.

Japanese Patent Publication No. 2010-116913 (Patent Literature 2) discloses a filter regeneration control device for a diesel engine, characterized in that the engine operation is controlled so that the amount of nitrogen oxide emission from the diesel engine is reduced when the timing for a filter regeneration processing comes. According to the device, even during the filter regeneration control, the emission amount of nitrogen oxide $NO_x$ is not increased, and the exhaust performance is not deteriorated.

CITATION LIST

Patent Literature

[Patent Literature 1] Japanese Patent Publication No. 2008-057333

[Patent Literature 2] Japanese Patent Publication No. 2010-116913

SUMMARY OF THE INVENTION

As described above, although various improvements have been proposed in respect to methods for efficiently generating particulate filters, the method disclosed in Japanese Patent Publication No. 2008-057333 (Patent Literature 1) still has room for improvement from the viewpoint of performing the filter regeneration in a short time and with high efficiency. Further, the method disclosed in Japanese Patent Publication No. 2010-116913 (Patent literature 2) has a problem that the engine efficiency is impaired along with the decrease of $NO_x$, and it is not perfect from the viewpoint of performing the filter regeneration with high efficiency in a short time. In particular, in a DPF carrying a SCR catalyst, which is currently the mainstream of post-treatment of exhaust gas from passenger car diesels, $NO_x$ is reduced by ammonia obtained by decomposing urea on the vehicle. However, when variously proposed catalysts having a strong oxidazing function are used in combination to promote soot oxidation combustion, there is a problem that ammonia is oxidized and $NO_x$ purification performance deteriorates.

In view of the above circumstances, in one embodiment, an object of the present invention is to provide a particulate filter that can efficiently perform filter regeneration in a short time even when low temperature exhaust gas is used as a filter regeneration gas. Further, in another embodiment, an object of the present invention is to provide a canning structure comprising such a particulate filter.

As a result of intensive studies to solve the above problems, the present inventors have found that, it is effective to cover a part or the whole of the outer peripheral side surface of a pillar-shaped honeycomb structure portion, which constitutes the particulate filter, with a low thermal conductive layer. By covering a part or the whole of the outer peripheral side surface of the pillar-shaped honeycomb structure portion with a low thermal conductive layer, it is possible to reduce the escape of heat from the outer peripheral side surface, so that the temperature decrease near the outer periphery of the particulate filter can be prevented. For this reason, it is possible to efficiently perform filter regeneration in a short time using low temperature exhaust gas. The present invention has been completed based on this finding, and is exemplarily shown as below.

(1)
A particulate filter, comprising:
a pillar-shaped honeycomb structure portion having a plurality of first cells extending from a first end face to a second end face, the first end face being open and the second end face being plugged, and a plurality of second cells extending from the first end face to the second end face, the first end face being plugged and the second end face being open, in which the first cells and the second cells are alternately arranged adjacent to each other with porous partition walls interposed therebetween; and
a low thermal conductive layer covering a part or the whole of an outer peripheral side surface of the pillar-shaped honeycomb structure portion, the thermal conductivity in a thickness direction of the low thermal conductive layer being 0.6 W/(m·K) or less.

(2)
The particulate filter according to (1), wherein a thickness of the low thermal conductive layer is 0.5 mm or more.

(3)
The particulate filter according to (1) or (2), wherein the low thermal conductive layer has one or more regions covering a part of the outer peripheral side surface of the pillar-shaped honeycomb structure portion.

(4)
The particulate filter according to (3), wherein a proportion of an area of the part covered by the low thermal conductive layer on the outer peripheral side surface of the pillar-shaped honeycomb structure portion is 30% to 100%.

(5)
The particulate filter according to any one of (1) to (4), wherein the low thermal conductive layer is an inorganic porous layer having a porosity of 40% or more and contains ceramic particles.

(6)
The particulate filter according to (5), wherein the ceramic particles comprise one or both of plate-shaped ceramic particles and needle-shaped ceramic particles.

(7)
The particulate filter according to (5) or (6), wherein the low thermal conductive layer further contains ceramic fibers.

(8)
The particulate filter according to any one of (1) to (7), wherein the low thermal conductive layer comprises one or more selected from the group consisting of alumina particles, $SiO_2$ glass particles, zirconia particles, cordierite scrap particles, and titania particles.

(9)
The particulate filter according to any one of (1) to (8), wherein the thickness of the low thermal conductive layer is 0.5 mm or more and 5 mm or less.

(10)
The particulate filter according to (1) to (9), wherein the thermal conductivity of the low thermal conductive layer is 0.4 W/(m·K) or less.

(11)
The particulate filter according to any one of (1) to (10), wherein the pillar-shaped honeycomb structure portion comprises as a main component any one selected from the group consisting of cordierite, mullite, aluminum titanate, silicon carbide, Si-bonded SiC, and silicon nitride.

(12)
The particulate filter according to any one of (1) to (11), wherein at least an outer surface of the low thermal conductive layer has been subjected to a hydrophobic treatment.

(13)
The particulate filter according to (12), wherein at least the outer surface of the low thermal conductive layer is coated with a hydrophobic resin.

(14)
A canning structure, comprising:
an exhaust pipe;
a particulate filter according to any one of (1) to (13) housed in the exhaust pipe; and
a buffer mat interposed between an inner surface of the exhaust pipe and the low thermal conductive layer of the particulate filter for holding the particulate filter in the exhaust pipe.

(15)
The canning structure according to (14), wherein a portion where the buffer mat comes into contact with the particulate filter is only on the outer surface of the low thermal conductive layer.

According to the particulate filter of one embodiment of the present invention, even if low temperature exhaust gas is used as a filter regeneration gas, filter regeneration can be efficiently performed in a short time. As a result, according to one embodiment of the present invention, various types of benefits such as reduction of fuel consumption required for soot combustion, suppression of dilution of lubricating oil by fuel, and suppression of decrease of $NO_x$ purification efficiency, can be obtained. As described above, in one embodiment, the present invention provides a breakthrough technological advance in filter regeneration technology, and has extremely high industrial utility value.

BRIEF DESCRIPTION OF THE DRAWINGS

FIG. 2-1 shows an end face view (a) and a side view (b) of a pillar-shaped honeycomb structure portion according to one embodiment of the present invention.

FIG. 2-2 shows an end face view (a) and a side view (b) of a pillar-shaped honeycomb structure portion according to another embodiment of the present invention.

FIG. 2-3 shows an end face view (a) and a side view (b) of a pillar-shaped honeycomb structure portion according to still another embodiment of the present invention.

FIG. 2-4 shows an end face view (a) and a side view (b) of a pillar-shaped honeycomb structure portion according to still another embodiment of the present invention.

FIG. 3-1 is a schematic cross-sectional view of a canning structure comprising a particulate filter according to the first embodiment of the present invention when observed from a cross section parallel to the direction in which the cells extend.

FIG. 3-2 is a schematic cross-sectional view of a canning structure comprising a particulate filter according to the second embodiment of the present invention when observed from a cross section parallel to the direction in which the cells extend.

FIG. 3-3 is a schematic cross-sectional view of a canning structure comprising a particulate filter according to the third embodiment of the present invention when observed from a cross section parallel to the direction in which the cells extend.

FIG. 3-4 is a schematic cross-sectional view of a canning structure comprising a particulate filter according to the fourth embodiment of the present invention when observed from a cross section parallel to the direction in which the cells extend.

FIG. 3-5 is a schematic cross-sectional view of a canning structure comprising a particulate filter according to the fifth embodiment of the present invention when observed from a cross section parallel to the direction in which the cells extend.

FIG. 3-6A is a schematic cross-sectional view of a canning structure comprising a particulate filter according to the sixth-A embodiment of the present invention when observed from a cross section parallel to the direction in which the cells extend.

FIG. 3-6B is a schematic cross-sectional view of a canning structure comprising a particulate filter according to the sixth-B embodiment of the present invention when observed from a cross section parallel to the direction in which the cells extend.

FIG. 3-7 is a schematic cross-sectional view of a canning structure comprising a particulate filter according to the seventh embodiment of the present invention when observed from a cross section parallel to the direction in which the cells extend.

FIG. 3-8 is a schematic cross-sectional view of a canning structure comprising a particulate filter according to the eighth embodiment of the present invention when observed from a cross section parallel to the direction in which the cells extend.

FIG. 3-9 is a schematic cross-sectional view of a canning structure comprising a particulate filter according to the ninth embodiment of the present invention when observed from a cross section parallel to the direction in which the cells extend.

FIG. 3-10 is a schematic cross-sectional view of a canning structure comprising a particulate filter according to the tenth embodiment of the present invention when observed from a cross section parallel to the direction in which the cells extend.

FIG. 3-11 is a schematic cross-sectional view of a canning structure comprising a particulate filter according to the eleventh embodiment of the present invention when observed from a cross section parallel to the direction in which the cells extend.

DETAILED DESCRIPTION OF THE INVENTION

Embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention. Also, the relationship between the thickness of each part in the figures is actually different from the actual ratio, and for the purpose of easy understanding the structures, thin parts are described in an enlarged manner, and are not shown by reflecting the actual thickness ratio as they are in actual products.

(1. Particulate Filter)

The particulate filter according to the present invention can be used as, for example, a DPF (Diesel Particulate Filter) and a GPF (Gasoline Particulate Filter), which are attached to an exhaust gas line from a combustion apparatus, typically an engine mounted on a vehicle, for collecting soot.

In particular, in a DPF for a passenger car, Cu-substituted zeolite, Fe-substituted zeolite, and the like are carried on the DPF in order to simultaneously have soot collection and $NO_x$ purification functions. In this case, $NO_x$ purification by ammonia obtained by decomposing urea on the vehicle is performed. However, a catalyst with an oxidizing function that promotes the oxidation of ammonia is unfortunately an obstacle to $NO_x$ purification, and thus catalysts with strong oxidation functions such as noble metals and alkali metals cannot be simultaneously carried, so the catalyst cannot be relied on to improve the soot regeneration efficiency. In this regard, the particulate filter according to the present invention is advantageous because the filter regeneration efficiency can be improved by a method that does not rely on a catalyst having an oxidizing function.

The particulate filter according to the present invention can be installed, for example, in an exhaust pipe. A buffer mat can be interposed between the inner surface of the exhaust pipe and the particulate filter for holding the particulate filter in the exhaust pipe.

Figure 1:
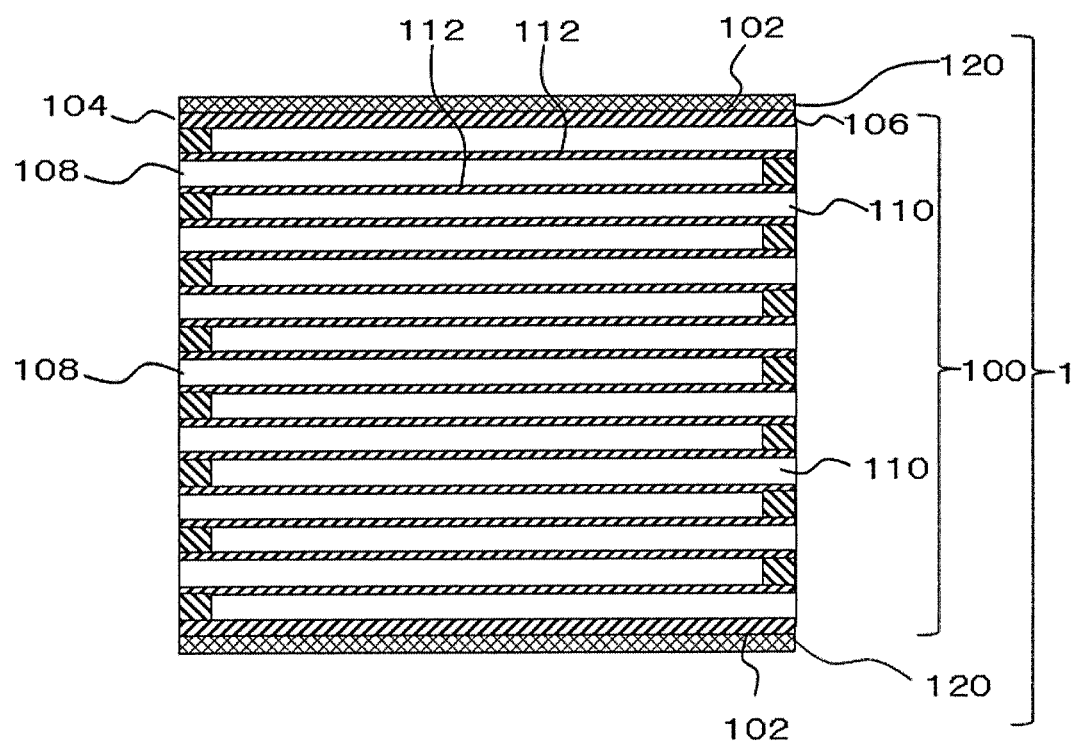
FIG. 1 is a schematic cross-sectional view of a particulate filter according to one embodiment of the present invention when observed from a cross section parallel to the direction in which the cells extend.

FIG. 1 is a schematic cross-sectional view of the particulate filter according to one embodiment of the present invention when observed from a cross section parallel to the direction in which the cells extend. The illustrated particulate filter 1 comprises a honeycomb structure portion 100 having an outer peripheral side surface 102; a plurality of first cells 108 disposed inside the outer peripheral side surface 102, extending from a first end face 104 to a second end face 106, the first end face 104 being open and the second end face 106 being plugged; and a plurality of second cells 110 disposed inside the outer peripheral side surface 102, extending from the first end 104 face to the second end face 106, the first end face 104 being plugged and the second end face 106 being open. Further, the honeycomb structure portion 100 comprises porous partition walls 112 that section and define the first cells 108 and the second cells 110, the first cells 108 and the second cells 110 are alternately arranged adjacent to each other with the partition walls 112 interposed therebetween.

When exhaust gas containing soot is supplied to the first end face 104 on the upstream side of the particulate filter 100, the exhaust gas is introduced into the first cells 108 and proceeds downstream in the first cells 108. In the first cells 108, the second end face 106 on the downstream side is plugged, so that the exhaust gas flows through the porous partition walls 112 that section the first cells 108 and the second cells 110 and flows into the second cells 110. Since soot cannot pass through the partition walls 112, it is collected and deposited in the first cells 108. After the soot is removed, the clean exhaust gas that has flowed into the second cells 110 proceeds downstream in the second cells 110 and flows out from the second end face 106 on the downstream side.

Further, the particulate filter 1 comprises a low thermal conductive layer 120 that covers a part or the whole of the outer peripheral side surface 102 of the pillar-shaped honeycomb structure portion 100. The low thermal conductive layer 120 has a thermal conductivity in the thickness direction of 0.6 W/(m·K) or less, that is, has a high heat insulation performance. For this reason, the escape of heat from the outer peripheral side surface 102 of the pillar-shaped honeycomb structure portion 100 can be reduced, so that the temperature decrease near the outer periphery of the particulate filter can be prevented.

(1-1 Pillar-Shaped Honeycomb Structure Portion)

The outer shape of the pillar-shaped honeycomb structure portion 100 is not particularly limited as long as it is pillar-shaped. For example, pillar shapes with the end face being polygonal or circular can be adopted. Polygons include quadrangles (rectangles, squares, etc.), hexagons, and the like, and circles include perfect circles, ellipses, and long circles. In a typical embodiment, the outer shape of the pillar-shaped honeycomb structure portion 100 may be a cylindrical shape or a quadrangular prism shape. Further, the size of the particulate filter 1 can be set to, for example, an end face area of 600 to 20,000 mm$^2$, typically 1000 to 3000 mm$^2$. The length (height) of the particulate filter 1 in the flow passage direction of the cells can be set to, for example, 100 to 500 mm, and typically 120 to 400 mm.

The shape of the cells in a cross section orthogonal to the direction in which the first cells 108 and the second cells 110 extend (the height direction) is not limited, but is preferably a quadrangle, a hexagon, an octagon, or a combination thereof. Among these, squares and hexagons are preferred. With such a cell shape, when the pillar-shaped honeycomb structure portion 100 is used as a particulate filter, the pressure loss when the exhaust gas flows is reduced, and the purification performance is excellent.

The partition walls 112 constituting the pillar-shaped honeycomb structure portion 100 preferably have a thermal conductivity of 3 W/(m·K) or more. When the thermal conductivity of the partition walls 112 is 3 W/(m·K) or more, the time required for raising the temperature of the pillar-shaped honeycomb structure portion 100 to a temperature required for soot combustion during filter regeneration can be reduced. The lower limit of the thermal conductivity of the partition walls 112 is more preferably 3 W/(m·K) or more, and still more preferably 5 W/(m·K) or more. There is no particular upper limit on the thermal conductivity of the partition walls 112, but it is typically 50 W/(m·K) or less. The thermal conductivity of the partition walls 112 can be measured at 25° C. by a laser flash method using a measurement sample collected by a cutting method using a rotating grindstone.

The porosity of the partition walls 112 can be, for example, about 30% to 80%, and preferably 35% to 65%. By setting the porosity of the partition walls within the above range, there is an advantage that the pressure loss can be suppressed while maintaining the strength of the manufactured honeycomb structure portion. On the other hand, if the porosity is lower than 30%, there is a problem that the pressure loss increases. If the porosity exceeds 80%, there is an influence such as a decrease in strength and a decrease in thermal conductivity. Here, the porosity can be measured by a mercury intrusion method.

The material of the pillar-shaped honeycomb structure portion 100 is not limited, but may be a porous ceramic. As to ceramics, cordierite, mullite, zirconium phosphate, aluminum titanate, silicon carbide, silicon-silicon carbide composite (for example, Si-bonded SiC), cordierite-silicon carbide composite, zirconia, spinel, indialite, sapphirine, corundum, titania, silicon nitride and the like may be mentioned. These ceramics may be contained one kind alone or may be contained two or more kinds at the same time. As examples of other materials for the pillar-shaped honeycomb structure portion 100, a porous sintered metal comprising an alloy component containing as a main component one or more selected from the group consisting of Fe, Cr, Mo, and Ni can be mentioned.

The pillar-shaped honeycomb structure portion 100 can be manufactured according to a publicly known method for manufacturing a honeycomb structure portion. First, a green body containing a predetermined ceramic raw material is prepared. Next, the green body is extrusion molded to form a honeycomb formed body. At the time of extrusion molding, a die having a desired overall shape, cell shape, partition wall thickness, cell density, and the like can be used. The method of plugging the end face of the honeycomb formed body is not particularly limited, and a well-known method of filling a plugging slurry into the cell openings on the end face on which a predetermined mask is attached may be employed. Thereafter, by firing the dried honeycomb formed body, a pillar-shaped honeycomb structure portion can be manufactured.

The pillar-shaped honeycomb structure portion 100 may be provided as an integrally molded product. In addition, the pillar-shaped honeycomb structure portion 100 can also be provided as a segment joined body by joining together the side surfaces of segments of a plurality of pillar-shaped honeycomb structure portions each having an outer peripheral side wall. By providing the pillar-shaped honeycomb structure portion 100 as a segment joined body, the thermal shock resistance can be improved.

The segment joined body can be manufactured, for example, as follows. Joining material is applied to the bonding surfaces (side surfaces) with the joining material adhesion preventing films attached to both end faces of each segment. Next, these segments are arranged adjacently such that the side surfaces of the segments face each other, and the adjacent segments are pressure bonded and then dried by heating. In this way, a segment joined body in which the side surfaces of the adjacent segments are joined by the joining material is manufactured.

The material for the joining material adhesion preventing film is not particularly limited. For example, a synthetic resin such as polypropylene (PP), polyethylene terephthalate (PET), polyimide, or Teflon (registered trademark) can be suitably used. Further, the film preferably has an adhesive layer, and the material of the adhesive layer is preferably an acrylic resin, a rubber resin (for example, a rubber mainly composed of natural rubber or synthetic rubber), or a silicone resin.

As to the joining material, for example, a material prepared by mixing a ceramic powder, a dispersion medium (for example, water, and the like), and, if necessary, additives such as a binder, a deflocculant, and a foamed resin can be used. As to ceramics, cordierite, mullite, zirconium phosphate, aluminum titanate, silicon carbide, silicon-silicon carbide composite (for example, Si-bonded SiC), cordierite-silicon carbide composite, zirconia, spinel, indialite, sapphirine, corundum, titania, silicon nitride and the like may be mentioned, and the same material as the pillar-shaped honeycomb structure portion is more preferable. As to the binder, polyvinyl alcohol and methyl cellulose and the like may be mentioned.

For the segment joined body, the outer peripheral portion may be ground to a desired shape (for example, a cylindrical shape), and after coating a coating material on the outer peripheral side surface, drying and heat treatment may be performed to form an outer peripheral coat layer. The coating material is not particularly limited, and a publicly known outer periphery coating material can be used. The outer peripheral coating material may be formed, for example, by adding additives such as an organic binder, a foamed resin, and a dispersant as well as water to an inorganic material such as inorganic fiber, colloidal silica, clay, ceramic particles, and kneading to form a slurry. The method for applying the outer peripheral coating material is not particularly limited, and a publicly known method can be used.

Figures 1, 2:
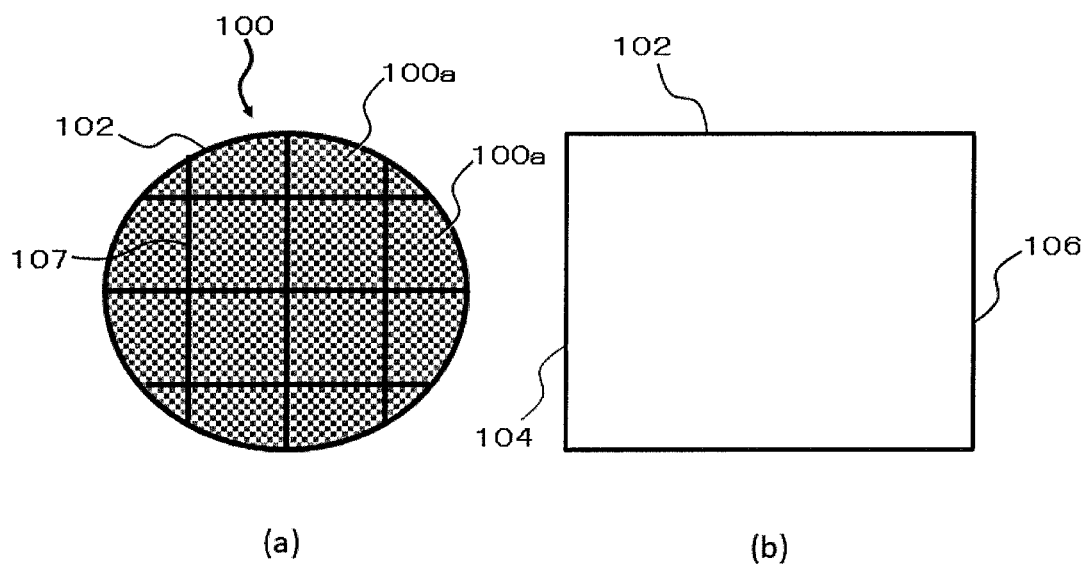
Figure 2:
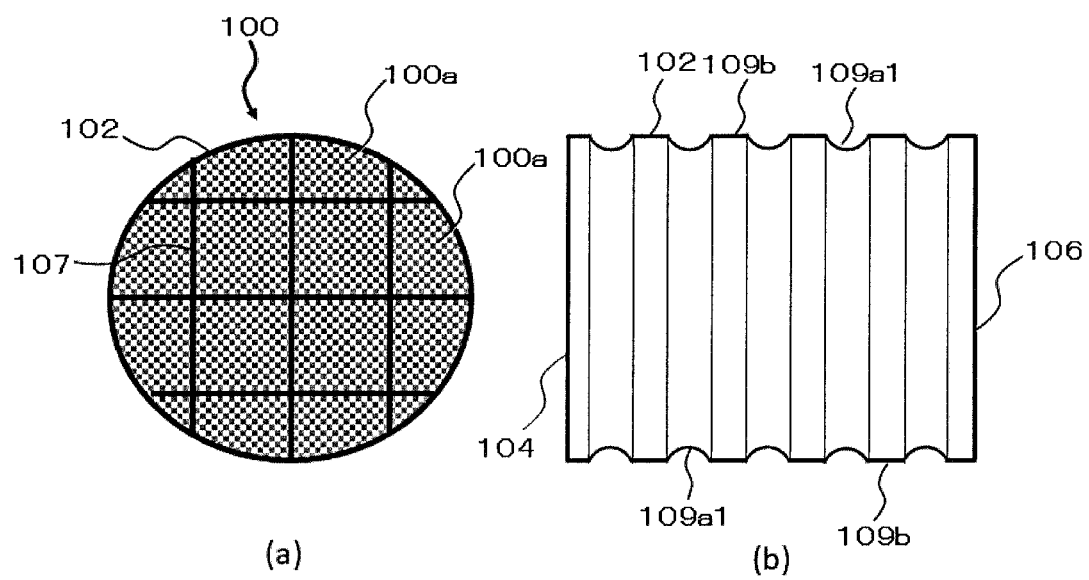

FIG. 2-1 shows an end face view (a) and a side view (b) of a pillar-shaped honeycomb structure portion 100 according to one embodiment of the present invention. In the present embodiment, the outer peripheral side surface 102 is cylindrical, and has a shape corresponding to the inner surface of the cylindrical exhaust pipe. Further, in the present embodiment, the plurality of segments 100a each having a pillar-shaped honeycomb structure portion are joined and integrated together by joining the side surfaces thereof with the joining material 107. The outer peripheral side surface 102 may be formed by the outer surface of the outer peripheral coat layer, or may be in a state where the cells are exposed immediately after the outer peripheral portion has been ground.

From the viewpoint of suppressing the heat from escaping from the outer peripheral side surface of the honeycomb structure portion, it is desirable that the area where the particulate filter contacts the outer peripheral side members such as the exhaust pipe and the buffer mat is small. For this reason, it is preferable that the outer peripheral side surface of the honeycomb structure portion comprise one or more concave portions (for example, grooves) on so that the outer peripheral side surface of the honeycomb structure portion does not contact the outer peripheral side members and a gap (insulating air layer) is formed between them. The depth of the concave portion is not limited, but may be, for example, 0.2 to 3 mm, and typically 0.5 to 1 mm.

As a method of forming the concave portion, a method of grinding the outer peripheral side surface with a grindstone before or after firing the honeycomb formed body may be mentioned. A concave portion may be formed on the outer peripheral coat layer. Since the concave portion may reach the cells forming the honeycomb structure portion, the concave portion is preferably gas-sealed before or after firing. The gas sealing method is not limited, but may be a method of forming the above-described outer peripheral coat layer or a low thermal conductive layer described later at the concave portion. At this time, the outer peripheral coat layer or the low thermal conductive layer described later may be formed only at the concave portion, or may be formed on the entire outer peripheral side surface. Further, the low thermal conductive layer described later may be formed on the outer peripheral coat layer at the concave portion. The thickness of the outer peripheral coat layer is not limited, but may be set to, for example, 0.1 to 2 mm, typically 0.2 to 0.5 mm. From the viewpoint of increasing the outer peripheral temperature of the honeycomb structure portion, the outer peripheral coat layer preferably has a low heat capacity, and more preferably has a thickness of 0.2 mm to 0.3 mm. In order to prevent the catalyst coat from leaking out, the porosity of the outer peripheral coat layer is preferably 20% or less, more preferably 5% or less.

FIG. 2-2 shows an end face view (a) and a side view (b) of a pillar-shaped honeycomb structure portion 100 according to another embodiment of the present invention. In the present embodiment, a plurality of segments 100a each having a pillar-shaped honeycomb structure portion are joined and integrated together by joining the side surfaces thereof with the joining material 107. Further, in the present embodiment, one or more concave portions 109a1 which coaxially orbits the outer peripheral side surface 102 of the honeycomb structure portion 100 around the central axis of the honeycomb structure portion 100 are formed and aligned side by side in the central axis direction of the honeycomb structure portion 100. When the concave portions 109a1 are arranged in a coaxial circular pattern in this manner, in order to enhance heat insulation performance, it is preferable to arrange two or more, and more preferable to arrange three or more concave portions 109a1. Further, it is preferable that the plurality of coaxial circular concave portions 109a1 are arranged at equal intervals in the central axis direction of the honeycomb structure portion 100. Where the concave portions 109a1 are not formed, one or two or more convex portions 109b remain in a coaxial circular pattern.

Figures 2, 3:
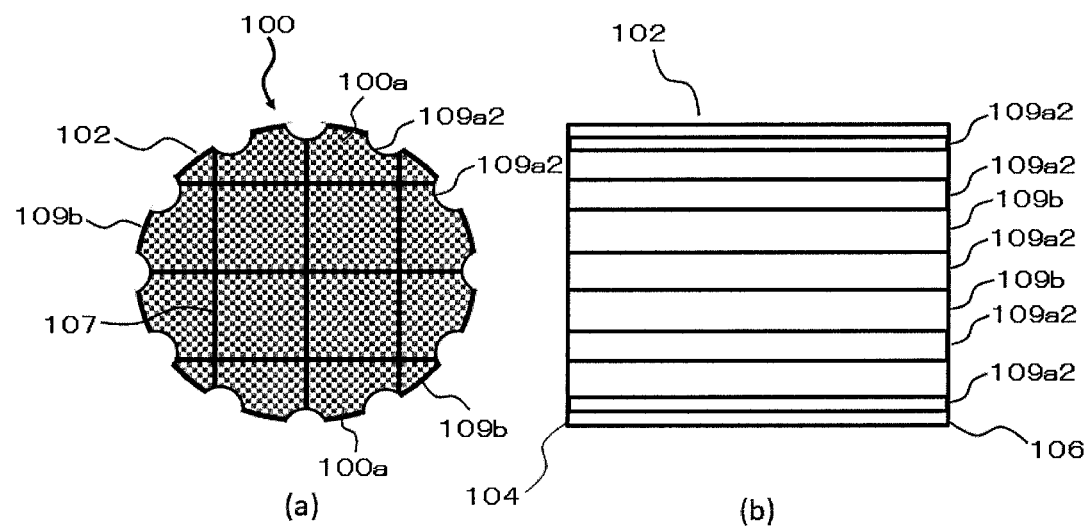

FIG. 2-3 shows an end face view (a) and a side view (b) of a pillar-shaped honeycomb structure portion 100 according to still another embodiment of the present invention. In the present embodiment, a plurality of segments 100a each having a pillar-shaped honeycomb structure portion are joined and integrated together by joining the side surfaces thereof with the joining material 107. Further, in the present embodiment, a plurality of concave portions 109a2 extending from the first end face 104 to the second end face 106 in parallel with the central axis of the honeycomb structure portion 100 are formed side by side in the circumferential direction of the honeycomb structure portion 100. When the concave portions 109a2 extending parallel to the central axis of the honeycomb structure portion 100 are formed in this manner, in order to enhance heat insulation performance, it is preferable to arrange one or more, and more preferable to arrange two or more concave portions 109a2. Where the concave portions 109a2 are not formed, one or two or more convex portions 109b extending parallel to the central axis remain.

Figures 2, 3, 4:
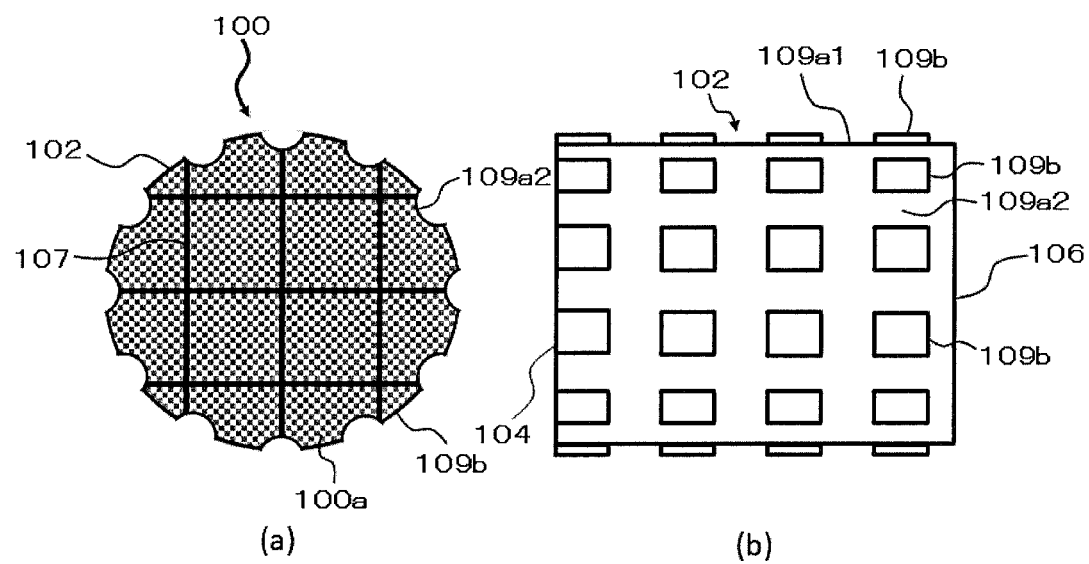

FIG. 2-4 shows an end face view (a) and a side view (b) of a pillar-shaped honeycomb structure portion 100 according to still another embodiment of the present invention. In the present embodiment, a plurality of segments 100a each having a pillar-shaped honeycomb structure portion are joined and integrated together by joining the side surfaces thereof with the joining material 107. Further, in the present embodiment, a plurality of coaxial circular concave portions 109a1 and a plurality of concave portions extending in the central axial direction are provided on the outer peripheral side surface of the pillar-shaped honeycomb structure portion 100 and connected such that a plurality of convex portions 109b are scattered and remain.

The pillar-shaped honeycomb structure portion 100 may carry an appropriate catalyst depending on its application. Examples of the catalyst include, but are not limited to, an oxidation catalyst (DOC) for oxidizing and burning hydrocarbons (HC) and carbon monoxide (CO) to increase the exhaust gas temperature, a PM combustion catalyst assisting the combustion of PM such as soot, a SCR catalyst and a NSR catalyst for removing nitrogen oxides ($NO_x$), and a three way catalyst capable of simultaneously removing hydrocarbons (HC), carbon monoxide (CO) and nitrogen oxides ($NO_x$). Catalysts may appropriately comprise, for example, noble metals (Pt, Pd, Rh, etc.), alkali metals (Li, Na, K, Cs, etc.), alkaline earth metals (Ca, Ba, Sr, etc.), rare earths (Ce, Sm, Gd, Nd Y, La, Pr, etc.), transition metals (Mn, Fe, Co, Ni, Cu, Zn, Sc, Ti, V, Cr, Zr, etc.) and the like.

Further, the particulate filter 1 may not carry a catalyst. Therefore, the particulate filter 1 does not carry an oxidation catalyst in one embodiment, and does not carry a PM combustion catalyst in another embodiment, and does not carry an SCR catalyst in yet another embodiment, and does not carry a three way catalyst in yet another embodiment, and does not carry any of an oxidation catalyst, a PM combustion catalyst, an SCR catalyst, or a three way catalyst in yet another embodiment.

(1-2 Low Thermal Conductive Layer)

The low thermal conductive layer 120 covering a part or the whole of the outer peripheral side surface 102 of the pillar-shaped honeycomb structure portion 100 has a thermal conductivity in the thickness direction of 0.6 W/(m·K) or less. From the viewpoint of enhancing the heat insulation performance, the upper limit of the thermal conductivity in the thickness direction of the low thermal conductive layer 120 is preferably 0.4 W/(m·K) or less, and is more preferably 0.3 W/(m·K) or less. There is no particular lower limit for the low thermal conductive layer 120, and the thermal conductivity in the thickness direction is most preferably 0.05 W/(m·K) or more. However, from the viewpoint of manufacturability, it is normally 0.08 W/(m·K) or more, and typically 0.1 W/(m·K) or more.

After cutting out the low thermal conductive layer and the pillar-shaped honeycomb structure portion in the vicinity with a grindstone, a measurement sample can be obtained by a method of removing portions other than the low thermal conductive layer by grinding in the thickness direction. The thermal conductivity of the low thermal conductive layer 120 in the thickness direction can be measured at 25° C. by a steady state method using this measurement sample.

From the viewpoint of enhancing the heat insulation performance, the lower limit of the thickness of the low thermal conductive layer is preferably 0.5 mm or more, more preferably 0.8 mm or more, and still more preferably 1 mm or more. On the other hand, from the viewpoint of reducing the heat capacity of the low thermal conductive layer itself, the upper limit of the thickness of the low thermal conductive layer is preferably 5 mm or less, more preferably 4 mm or less, and still more preferably 3 mm or less. From the viewpoint of reducing the heat capacity of the low thermal conductive layer, the specific heat of the low thermal conductive layer is preferably 0.2 J/g/K or less, and more preferably 0.1 J/g/K or less.

When the low thermal conductive layer 120 covers a part of the outer peripheral side surface 102 of the pillar-shaped honeycomb structure portion 100, the region where the low thermal conductive layer 120 covers the part of the outer peripheral side 102 of the pillar-shaped honeycomb structure portion 100 may be one region, or it may be divided into two or more regions. For example, in the pillar-shaped honeycomb structure portion 100 according to the embodiment shown in FIG. 2-2, only the surface of the one or more convex portions 109$b$ having a coaxial circular pattern can be covered with the low thermal conductive layer. In the pillar-shaped honeycomb structure portion 100 according to the embodiment shown in FIG. 2-3, only the surface of the one or more convex portions 109$b$ extending parallel to the central axis can be covered with the low thermal conductive layer. In the pillar-shaped honeycomb structure portion 100 according to the embodiment shown in FIGS. 2-4, only the surface of the one or more of the convex portions 109$b$ scattered can be covered with the low thermal conductive layer.

When the particulate filter is installed in an exhaust pipe, the convex portions 109$b$ are portions that come into contact with outer peripheral members such as the exhaust pipe and the buffer mat, so it is preferred that the entire surface of the convex portion 109$b$ be covered with the low thermal conductive layer.

Several embodiments in which the low thermal conductive layer 120 covers the whole of the outer peripheral side surface 102 of the pillar-shaped honeycomb structure portion 100 are described below. For example, in the pillar-shaped honeycomb structure portion 100 according to the embodiment shown in FIG. 2-1, the entire outer peripheral side surface 102 can be covered with the low thermal conductive layer. In the pillar-shaped honeycomb structure portion 100 according to the embodiment shown in FIG. 2-2, the entire outer peripheral side surface 102 including the surfaces of the coaxial circular concave portions 109$a$1 and the convex portions 109$b$ can be covered with the low thermal conductive layer 120. In the pillar-shaped honeycomb structure portion 100 according to the embodiment shown in FIG. 2-3, the entire outer peripheral side surface 102 including the surfaces of the concave portions 109$a$2 extending parallel to the central axis and the convex portions 109$b$ can be covered with the low thermal conductive layer 120. In the pillar-shaped honeycomb structure portion 100 according to the embodiment shown in FIG. 2-4, the entire outer peripheral side surface 102 including the surface of the coaxial circular concave portions 109$a$1, the concave portion 109$a$2 extending parallel to the central axis, and the convex portions 109$b$ can be covered with the low thermal conductive layer 120. Since the low thermal conductive layer 120 covers the whole of the outer peripheral side surface 102 of the pillar-shaped honeycomb structure portion 100, the heat insulating performance is improved, and it is not necessary to separately apply the low thermal conductive layer 120, so that the process of forming the low thermal conductive layer 120 can be simplified.

From the viewpoint of improving the heat insulation performance, it is desirable that the ratio of the area of the portion covered by the low thermal conductive layer on the outer peripheral side surface of the pillar-shaped honeycomb structure portion is high. For this reason, in one embodiment, the ratio of the area of the portion covered with the low thermal conductive layer on the outer peripheral side surface of the pillar-shaped honeycomb structure portion is 30 to 100%. The ratio of the area is preferably 50 to 100%, more preferably 70 to 100%, and still more preferably 90 to 100%.

From the viewpoint of enhancing the heat insulation performance, the low thermal conductive layer is preferably inorganic porous. In one embodiment, the low thermal conductive layer may comprise ceramic particles, and may utilize spherical ceramic particles. However, among the ceramic particles, it is preferable to use at least one of plate-shaped ceramic particles and needle-shaped ceramics. The ceramic particles are preferably one or two or more selected from the group consisting of alumina ($Al_2O_3$) particles, $SiO_2$ glass particles, zirconia ($ZrO_2$) particles, cordierite scrap particles ($2MgO.2Al_2O_3.5SiO_2$), and titania ($TiO_2$) particles. Among these, it is more preferable to include one or both of the plate-shaped ceramic particles and the needle-shaped ceramic particles. In addition, as ceramic particles, metal oxide particles such as spinel ($MgAl_2O_4$), magnesia ($MgO$), mullite ($Al_6O_{13}Si_2$), and cordierite ($MgO.Al_2O_3.SiO_2$) may be comprised.

The low thermal conductive layer preferably contains ceramic fibers in addition to the ceramic particles. The ceramic fibers preferably comprise one or more selected from the group consisting of alumina ($Al_2O_3$) fibers, $SiO_2$ glass fibers, zirconia fibers, cordierite scrap fibers, and titania fibers. In addition, as ceramic fibers, metal oxides such as spinel ($MgAl_2O_4$), titania ($TiO_2$), zirconia ($ZrO_2$), magnesia ($MgO$), mullite ($Al_6O_{13}Si_2$), cordierite ($MgO.Al_2O_3.SiO_2$) may be comprised.

In one embodiment, the low thermal conductive layer comprises 5% by mass or more, preferably 20% by mass or more, still more preferably 30% by mass or more, and for example, 40% by mass or more of alumina ($Al_2O_3$). Alumina may be provided as plate-shaped alumina particles, or may be provided as alumina fibers, or may be provided as a combination of plate-shaped alumina particles and alumina fibers.

In one embodiment, the low thermal conductive layer may comprise 5% to 55% by mass of alumina ($Al_2O_3$) particles, 45% to 85% by mass of titania ($TiO_2$) particles, and ceramic fibers.

The low thermal conductive layer may further comprise minerals and clays such as talc ($Mg_3Si_4O_{10}(OH)_2$), mica, kaolin, and may comprise glass, colloidal silica and the like.

The plate-shaped ceramic particles and the needle-shaped ceramic particles can function as an aggregate or a reinforcing material in the low thermal conductive layer. Namely, the plate-shaped ceramic particles and the needle-shaped ceramic particles can enhance the strength of the low thermal conductive layer and suppress the shrinkage of the low thermal conductive layer during the production. The plate-shaped ceramic particles and the needle-shaped ceramic particles can also sever heat transfer paths in the low thermal conductive layer. Accordingly, heat insulation performance can be improved compared with the case where only spherical ceramic particles and/or ceramic fibers are used as the aggregate.

The average size of the plate-shaped ceramic particles and the needle-shaped ceramic particles in the longitudinal direction may be 1 μm or more and 100 μm or less. When the average size in the longitudinal direction is 5 μm or more, excessive sintering of the ceramic particles can be suppressed. If the average size in the longitudinal direction is 100 μm or less, the effect of severing the heat transfer path in the low thermal conductive layer as described above can be obtained, and thus can be suitably applied to a composite member used in a high temperature environment. Further, the plate-shaped ceramic particles and the needle-shaped ceramic particles may have an average aspect ratio of 5 or more and 100 or less. If the average aspect ratio is 5 or more, sintering of the ceramic particles can be favorably suppressed, and if it is 100 or less, the strength reduction of the plate-shaped ceramic particles and the needle-shaped ceramic particles themselves can be suppressed. The average size of the plate-shaped ceramic particles and the needle-shaped ceramic particles in the longitudinal direction is measured by SEM image analysis. Specifically, the diameter of the smallest circle that can surround each ceramic particle is determined from the SEM image, and this is defined as the size of each ceramic particle in the longitudinal direction. Then, the sizes of the plurality of ceramic particles are calculated, and the average value thereof is defined as the average size in the longitudinal direction. Further, the average aspect ratio of the plate-shaped ceramic particles and the needle-shaped ceramic particles are respectively expressed as: the average aspect ratio of the plate-shaped ceramic particles and the needle-shaped ceramic particles=the average size in the longitudinal direction of the plate-shaped ceramic particles and the needle-shaped ceramic particles/the average size in the lateral direction of the plate-shaped ceramic particles and the needle-shaped ceramic particles. The average size in the lateral direction of the plate-shaped ceramic particles and the needle-shaped ceramic particles is measured by SEM image analysis. Specifically, the diameter of the largest circle that can be surrounded by each ceramic particle is determined from the SEM image, and this is defined as the size of each ceramic particle in the lateral direction. Then, the sizes of the plurality of ceramic particles are calculated, and the average value thereof is defined as the average size in the lateral direction.

When spherical ceramic particles are used, the average size can be, for example, 0.1 μm or more and 20 μm or less, and preferably 2 μm or more and 10 μm or less. The average size of the spherical ceramic particles is measured by SEM image analysis. Specifically, an equivalent circle diameter is determined from the SEM image based on the area of each ceramic particle, and this is defined as the size of each ceramic particle. Then, the sizes of the plurality of ceramic particles are calculated, and the average value thereof is defined as the average size.

By adding ceramic fibers to the low thermal conductive layer in addition to ceramic particles, the strength of the low thermal conductive layer can be improved. Further, the ceramic fibers suppress the contraction of the low thermal conductive layer in the manufacturing process. The average length of the ceramic fibers may be 50 μm or more and 200 μm or less. Further, the diameter (average diameter) of the ceramic fibers may be 1 to 20 μm. The volume ratio of the ceramic fibers in the low thermal conductive layer (the volume ratio of the ceramic fibers in the material constituting the low thermal conductive layer) may be 5% by volume or more and 25% by volume or less. By comprising 5% by volume or more of ceramic fibers, shrinkage of ceramic particles in the low thermal conductive layer can be sufficiently suppressed in the process of manufacturing the low thermal conductive layer (firing step). Further, by setting the volume ratio of the ceramic fiber to 25% by volume or less, the heat transfer path in the low heat conduction layer can be divided, and thus can be suitably applied to a composite member used in a high temperature environment.

The lower limit of the porosity of the low thermal conductive layer 120 is preferably 40% or more, more preferably 50% or more, and still more preferably 70% or more. However, if the porosity is too high, the strength is reduced. Therefore, the upper limit of the porosity is preferably 85% or less, more preferably 80% or less, and still more preferably 75% or less. Here, the porosity can be measured by a mercury intrusion method.

As a method for forming the low thermal conductive layer, a method, in which a raw material is applied to at least a part of the outer peripheral side surface of the pillar-shaped honeycomb structure portion, followed by drying and firing, may be mentioned. As a method for applying the raw materials, dip coating, spin coating, spray coating, slit die coating, thermal spraying, aerosol deposition (AD) method, printing, brush coating, trowel coating, mold casting forming, and the like can be used. In addition, when the thickness of the target low thermal conductive layer is thick, or when the low thermal conductive layer has a multilayer structure, the application of the raw material and the drying of the raw material may be repeated a plurality of times to adjust the target thickness or the multilayer structure.

As a raw material of the low thermal conductive layer, in addition to the ceramic particles and the ceramic fibers, a mixture containing a binder, a pore forming material, and a solvent may be used. As the binder, an inorganic binder may be used. Examples of the inorganic binder include an alumina sol, a silica sol, a titania sol, and a zirconia sol. These inorganic binders can improve the strength of the low thermal conductive layer after firing. As the pore forming material, a polymer-based pore forming material, carbon-based powder, or the like may be used. Specific examples include acrylic resin, melamine resin, polyethylene particles, polystyrene particles, carbon black powder, graphite powder and the like. The pore forming material may have various shapes depending on the purpose, and may be, for example, a sphere, a plate, a fiber, or the like. The porosity and pore size of the low thermal conductive layer can be adjusted by selecting the amount, size, shape, and the like of the pore forming material. The solvent only needs to be able to adjust the viscosity of the raw material without affecting other raw materials, and for example, water, ethanol, isopropyl alcohol (IPA), or the like can be used.

It is preferable that at least the outer surface of the low thermal conductive layer be subjected to a hydrophobic treatment in order to prevent wetting with water. As a method of the hydrophobic treatment, for example, there is a method of coating the outer surface of the low thermal conductive layer with a hydrophobic resin, but is not limited to this method. Examples of the hydrophobic resin include a fluororesin (for example, polytetrafluoroethylene, perfluoroalkoxyalkane, etc.). The heat resistant temperature of the hydrophobic resin is preferably 200° C. or higher. As a method of the hydrophobic treatment, there is also a method of treating the outer surface of the low thermal conductive layer with a hydrophobic agent such as a silane compound having an alkyl group.

The buffer mat for holding the particulate filter during canning easily absorbs water, urea water, and the like, and thus tends to easily conduct heat. By preventing the wetting of the low thermal conductive layer, the heat insulating property of the low thermal conductive layer can be maintained, and even in the case where the buffer mat becomes wet and heat is easily transmitted, the heat insulating property of the low thermal conductive layer in the thickness direction is maintained.

(2. Canning Structure)

According to one embodiment of the present invention, there is provided a canning structure, comprising:

an exhaust pipe;

a particulate filter according to the present invention housed in the exhaust pipe; and a buffer mat interposed between an inner surface of the exhaust pipe and the low thermal conductive layer of the particulate filter for holding the particulate filter in the exhaust pipe.

Any buffer mat may be used as long as it can suppress the movement of the particulate filter in the direction in which the cells extend when the particulate filter is canned, and a publicly known buffer mat can be used. Examples of the buffer mat include a non-expandable ceramic fiber mat and a heat-expandable mineral material mat.

In the exhaust pipe, the portion where the buffer mat comes into contact with the particulate filter is preferably only the outer surface of the low thermal conductive layer. Thereby, it is possible to reduce the heat that escapes from the outer peripheral side surface of the particulate filter through the buffer mat, and it is possible to enhance the effect of preventing a temperature drop near the outer periphery of the particulate filter.

FIG. 3-1 shows a schematic cross-sectional view of a canning structure 310 according to the first embodiment of the present invention when observed from a cross section parallel to the direction in which the cells extend. The canning structure 310 comprise an exhaust pipe 220, a particulate filter 1 housed in the exhaust pipe 220, and a buffer mat 210 interposed between an inner surface of the exhaust pipe 220 and the low thermal conductive layer 120 for holding the particulate filter 1 in the exhaust pipe. In the canning structure 310, the entire outer peripheral side surface 102 of the pillar-shaped honeycomb structure portion 100 is covered with the low thermal conductive layer 120. Further, in the canning structure 310, the outer peripheral side surface 102 of the pillar-shaped honeycomb structure portion 100 is in a state where the cells are exposed, but the low thermal conductive layer 120 also serves as a gas seal, so there is an advantage that the effort for specially forming an outer peripheral coat layer can be omitted.

FIG. 3-2 shows a schematic cross-sectional view of a canning structure 320 according to the second embodiment of the present invention when observed from a cross section parallel to the direction in which the cells extend. The canning structure 320 comprise an exhaust pipe 220, a particulate filter 1 housed in the exhaust pipe 220, and a buffer mat 210 interposed between an inner surface of the exhaust pipe 220 and the low thermal conductive layer 120 for holding the particulate filter 1 in the exhaust pipe. In the canning structure 320, the outer peripheral coat layer 114 forms the outer peripheral side surface 102 of the pillar-shaped honeycomb structure portion 100, and the entire outer peripheral side surface 102 is covered with the low thermal conductive layer 120.

FIG. 3-3 shows a schematic cross-sectional view of a canning structure 330 according to the third embodiment of the present invention when observed from a cross section parallel to the direction in which the cells extend. The canning structure 330 comprise an exhaust pipe 220, a particulate filter 1 housed in the exhaust pipe 220, and a buffer mat 210 interposed between an inner surface of the exhaust pipe 220 and the low thermal conductive layer 120 for holding the particulate filter 1 in the exhaust pipe. In the canning structure 330, the outer peripheral coat layer 114 forms the outer peripheral side surface 102 of the pillar-shaped honeycomb structure portion 100.

The outer peripheral coat layer 114 of the canning structure 330 has a coaxial circular convex portion 109*b* at the center of the pillar-shaped honeycomb structure portion 100 in the height direction (the direction in which the cells extend), and the convex portion 109*b* is covered with the low thermal conductive layer 120. Coaxial circular concave portions 109*a*1 are formed adjacent to the first end face 104 side and the second end face 106 side of the convex portion 109*b*, respectively. The portion where the buffer mat 210 contacts the particulate filter 1 is only on the outer surface of the low thermal conductive layer 120. In the portion where the concave portions 109*a*1 are formed on the outer peripheral side surface 102 of the honeycomb structure portion 100, a gap is formed between the outer peripheral side surface of the honeycomb structure portion 100 and the outer peripheral side members. With this configuration, the area where the particulate filter 1 contacts the outer peripheral side members is reduced, and the heat insulation performance can be improved.

FIG. 3-4 shows a schematic cross-sectional view of a canning structure 340 according to the fourth embodiment of the present invention when observed from a cross section parallel to the direction in which the cells extend. The canning structure 340 comprise an exhaust pipe 220, a particulate filter 1 housed in the exhaust pipe 220, and a buffer mat 210 interposed between an inner surface of the exhaust pipe 220 and the low thermal conductive layer 120 for holding the particulate filter 1 in the exhaust pipe. In the canning structure 340, the outer peripheral coat layer 114 forms the outer peripheral side surface 102 of the pillar-shaped honeycomb structure portion 100.

The outer peripheral coat layer 114 of the canning structure 330 has a coaxial circular concave portion 109*a*1 at the center of the pillar-shaped honeycomb structure portion 100 in the height direction (the direction in which the cells extend), and the coaxial circular convex portions 109*b* are formed adjacent to the first end face 104 side and the second end face 106 side of the concave portion 109a1, respectively, and the convex portion 109b is covered with the low thermal conductive layer 120. The portion where the buffer mat 210 contacts the particulate filter 1 is only on the outer surface of the low thermal conductive layer 120. In the portion where the concave portion 109a1 is formed on the outer peripheral side surface 102 of the honeycomb structure portion 100, a gap is formed between the outer peripheral side surface 102 of the honeycomb structure portion 100 and the outer peripheral side members. With this configuration, the area where the particulate filter 1 contacts the outer peripheral side members is reduced, and the heat insulation performance can be improved.

Figures 1, 3:
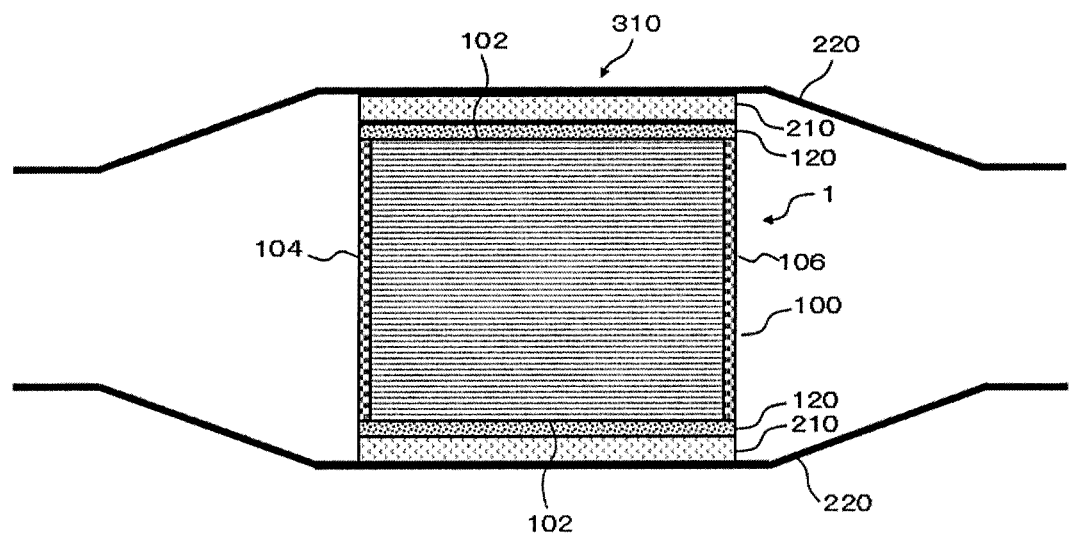
Figures 2, 3:
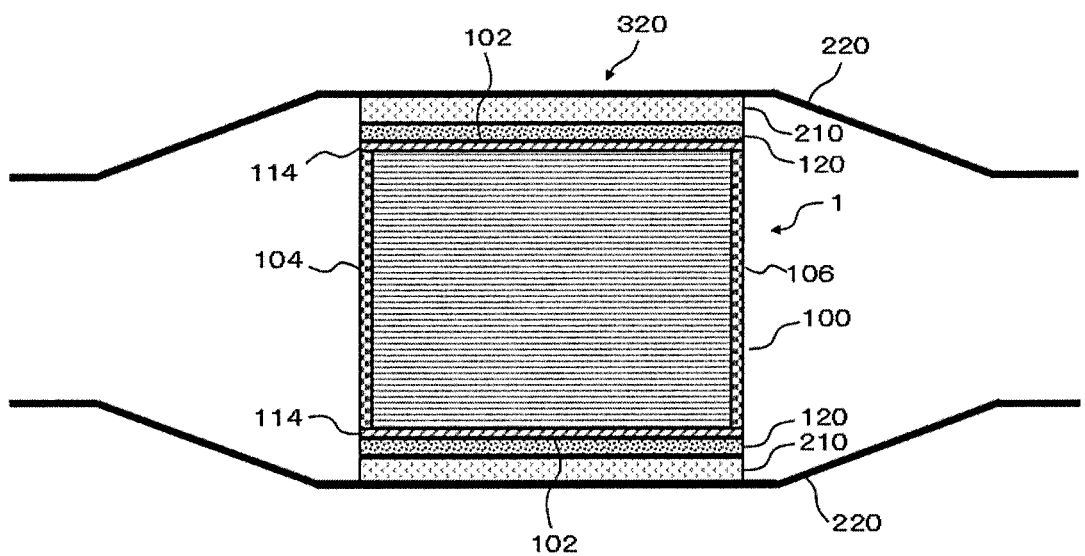
Figure 3:
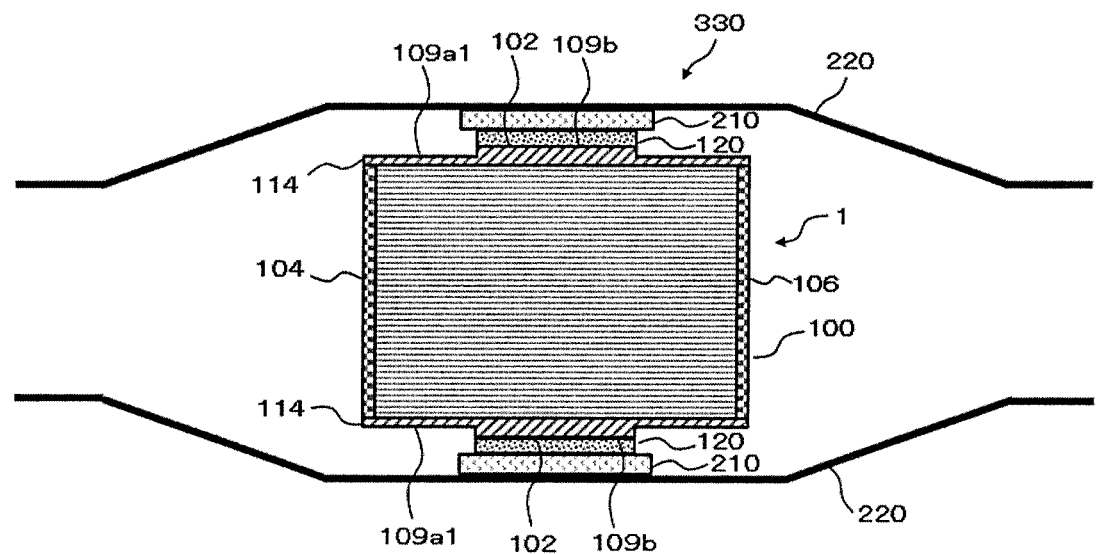
Figures 3, 4:
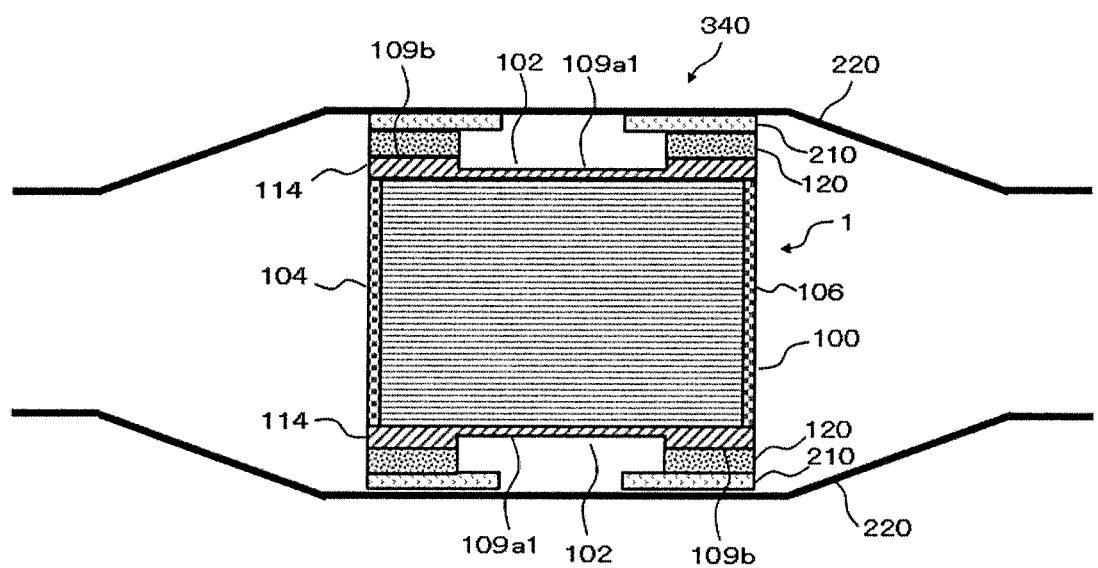
Figures 3, 4, 5:
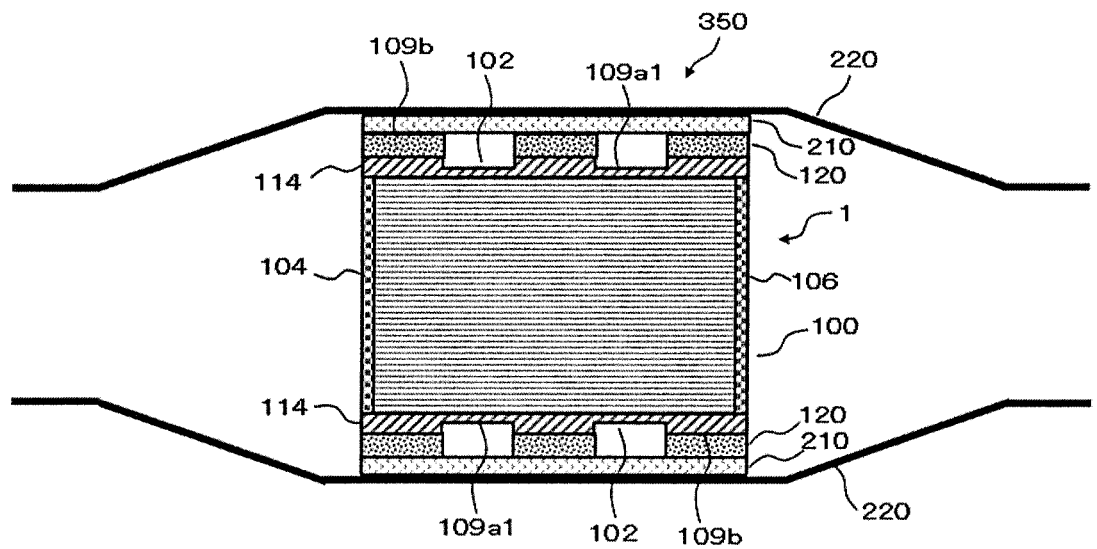
Figures 3, 4, 5, 6, 6A:
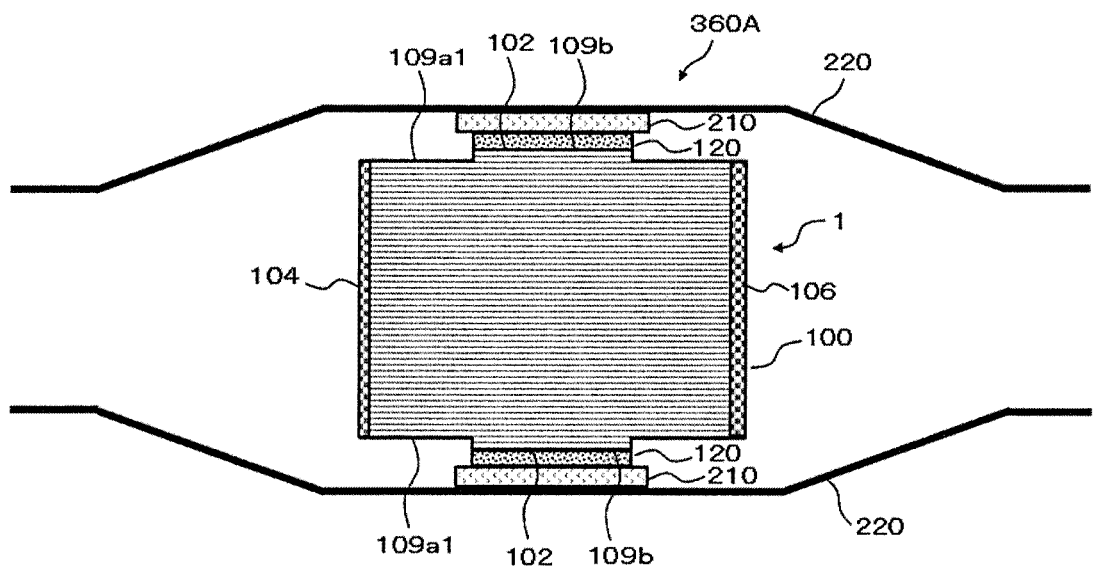
Figures 3, 4, 5, 6, 6B:
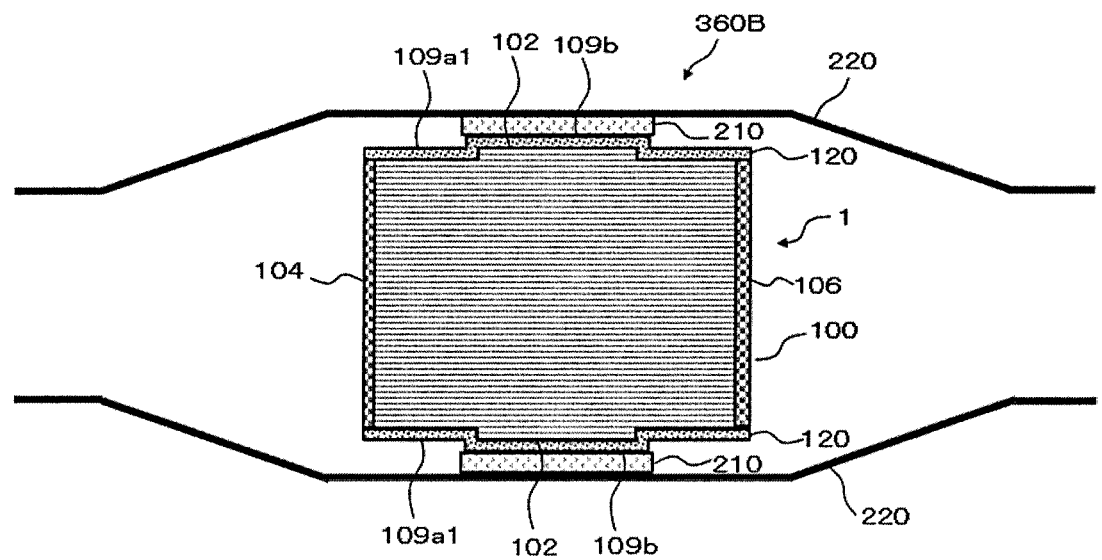
Figures 3, 4, 5, 6, 7:
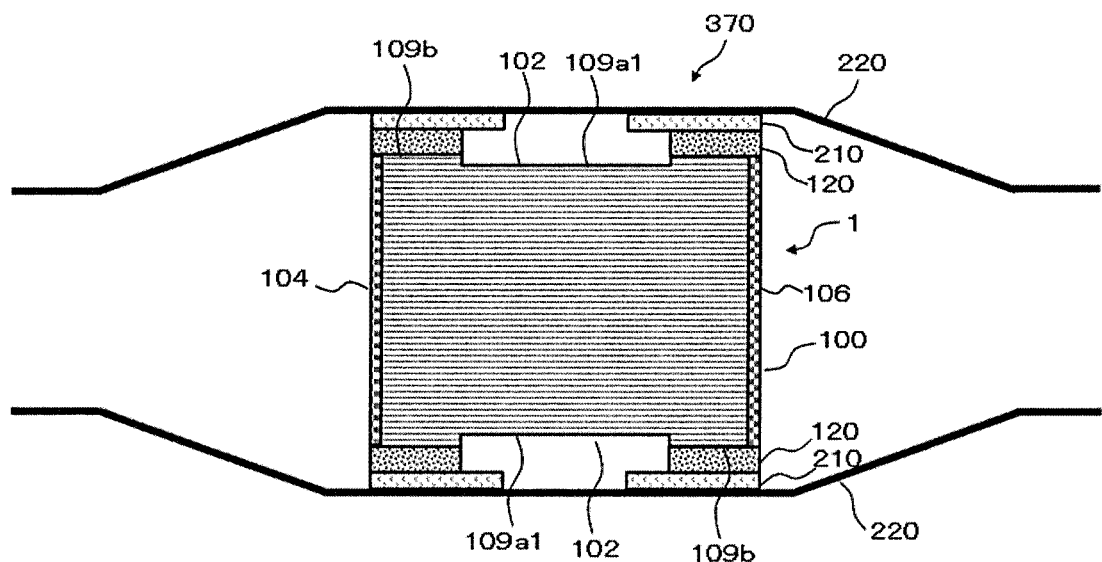
Figures 3, 4, 5, 6, 7, 8:
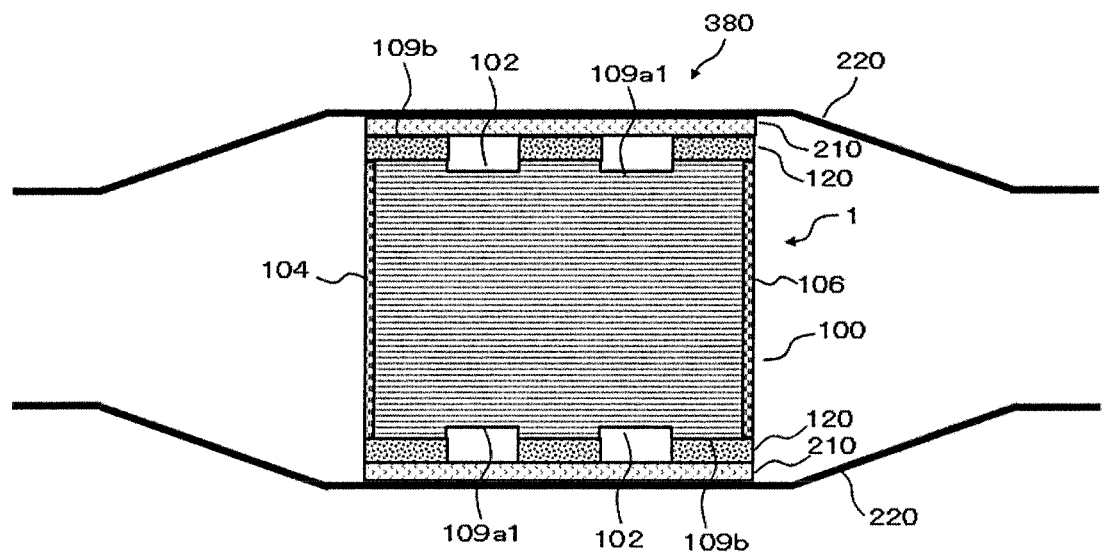
Figures 3, 4, 5, 6, 7, 8, 9:
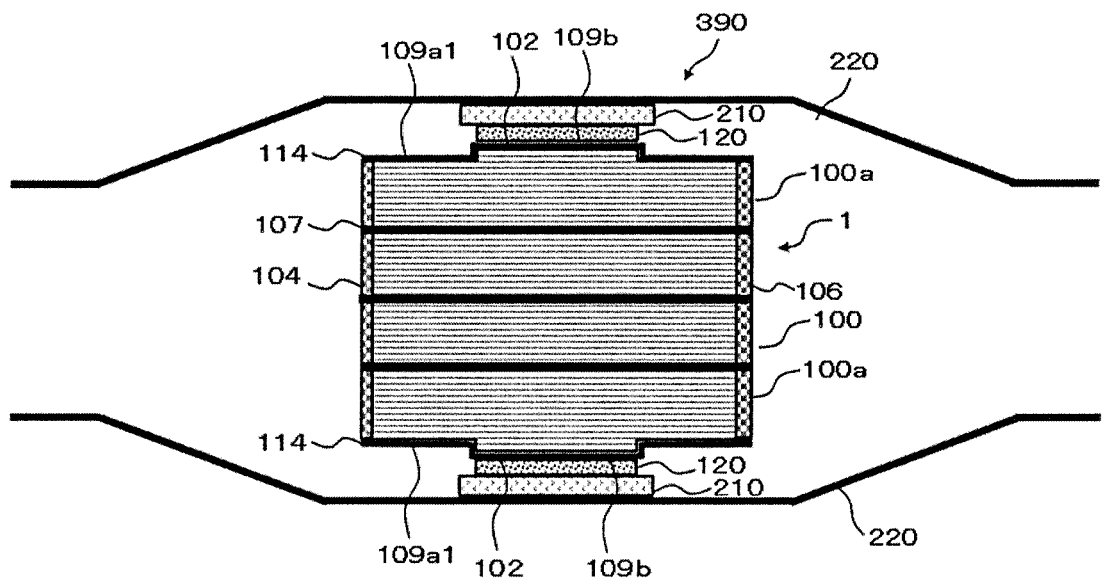
Figures 3, 4, 5, 6, 7, 8, 9, 10:
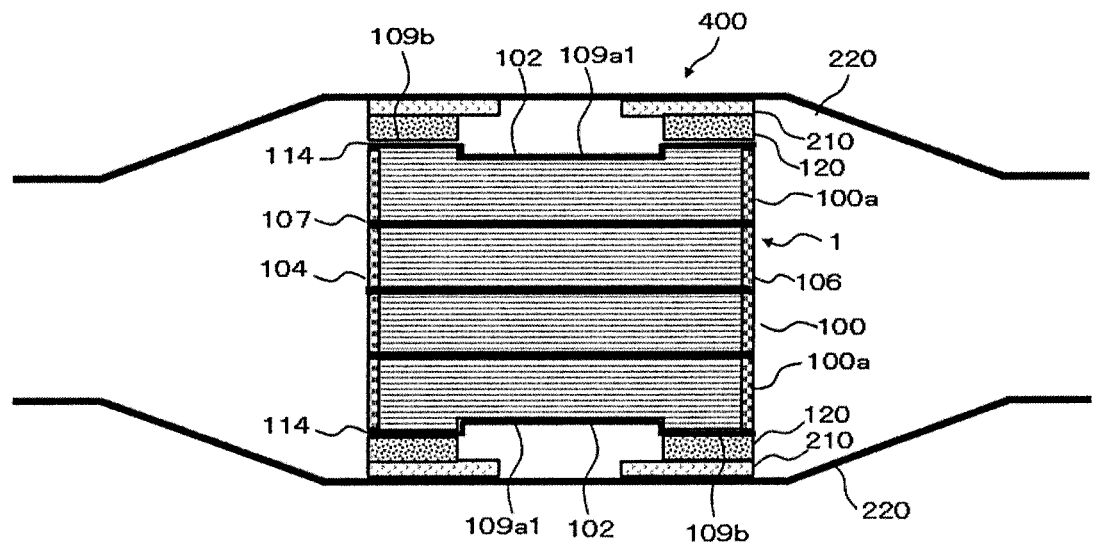
Figures 3, 4, 5, 6, 7, 8, 9, 10, 11:
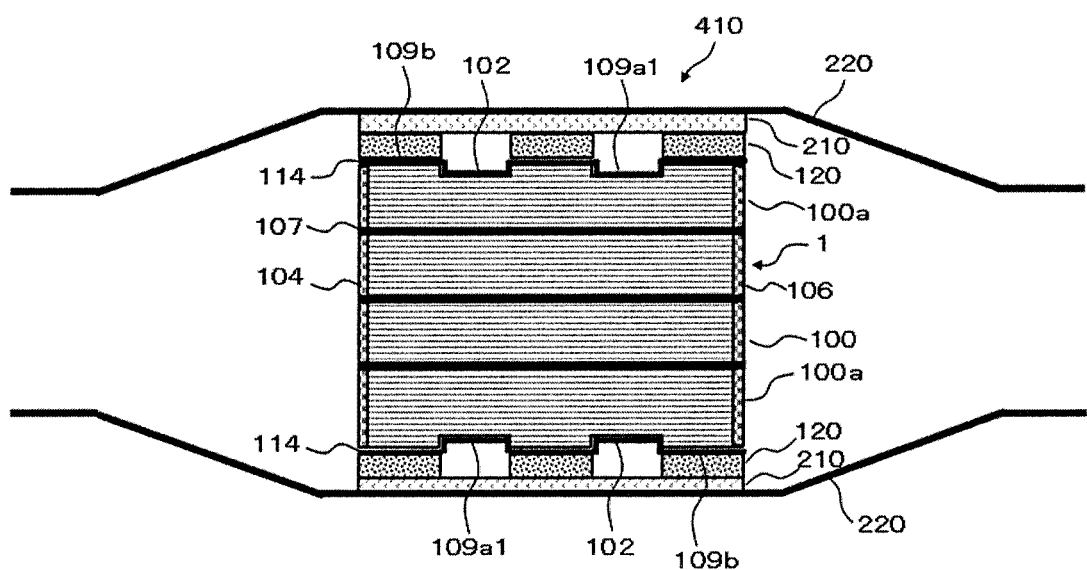

FIG. 3-5 shows a schematic cross-sectional view of a canning structure 350 according to the fifth embodiment of the present invention when observed from a cross section parallel to the direction in which the cells extend. The canning structure 350 comprise an exhaust pipe 220, a particulate filter 1 housed in the exhaust pipe 220, and a buffer mat 210 interposed between an inner surface of the exhaust pipe 220 and the low thermal conductive layer 120 for holding the particulate filter 1 in the exhaust pipe. In the canning structure 350, the outer peripheral coat layer 114 forms the outer peripheral side surface 102 of the pillar-shaped honeycomb structure portion 100.

The outer peripheral coat layer 114 of the canning structure 350 has three coaxial circular convex portions 109b and two coaxial circular concave portions 109a1, which are formed in the height direction (the direction in which the cells extend) of the pillar-shaped honeycomb structure portion 100, alternately and adjacently in the order of convex portion, concave portion, convex portion, concave portion, and convex portion. The convex portions 109b are covered with the thermal conductive layer 120. The portion where the buffer mat 210 contacts the particulate filter 1 is only on the outer surface of the low thermal conductive layer 120. In the portion where the concave portions 109a1 are formed on the outer peripheral side surface 102 of the honeycomb structure portion 100, a gap is formed between the outer peripheral side surface 102 of the honeycomb structure portion 100 and the outer peripheral side members. With this configuration, the area where the particulate filter 1 contacts the outer peripheral side members is reduced, and the heat insulation performance can be improved.

FIG. 3-6A shows a schematic cross-sectional view of a canning structure 360A according to the sixth-A embodiment of the present invention when observed from a cross section parallel to the direction in which the cells extend. The canning structure 360A comprise an exhaust pipe 220, a particulate filter 1 housed in the exhaust pipe 220, and a buffer mat 210 interposed between an inner surface of the exhaust pipe 220 and the low thermal conductive layer 120 for holding the particulate filter 1 in the exhaust pipe.

The outer peripheral coat layer 114 of the canning structure 360A has a coaxial circular convex portion 109b at the center of the pillar-shaped honeycomb structure portion 100 in the height direction (the direction in which the cells extend), and the coaxial circular convex portions 109b is covered with the low thermal conductive layer 120. Since an outer peripheral coat layer is not formed at the convex portion 109b, the low thermal conductive layer 120 also serves as a gas seal. The coaxial circular concave portions 109a1 are formed adjacent to the first end face 104 side and the second end face 106 side of the convex portion 109b, respectively. The concave portion 109a1 is covered with a thin, minimum thickness outer peripheral coat layer. The portion where the buffer mat 210 contacts the particulate filter 1 is only on the outer surface of the low thermal conductive layer 120. In the portion where the concave portion 109a1 is formed on the outer peripheral side surface 102 of the honeycomb structure portion 100, a gap is formed between the outer peripheral side surface 102 of the honeycomb structure portion 100 and the outer peripheral side members. With this configuration, the area where the particulate filter 1 contacts the outer peripheral side members is reduced, and the heat insulation performance can be improved.

FIG. 3-6B shows a schematic cross-sectional view of a canning structure 360B according to the sixth-B embodiment of the present invention when observed from a cross section parallel to the direction in which the cells extend. The canning structure 360B differs from the canning structure 360A shown in FIG. 3-6A in that the low thermal conductive layer 120 covers the entire outer peripheral side surface of the pillar-shaped honeycomb structure portion 100. Other configurations of the canning structure 360B are the same as those of the canning structure 360A shown in FIG. 3-6A.

FIG. 3-7 shows a schematic cross-sectional view of a canning structure 370 according to the seventh embodiment of the present invention when observed from a cross section parallel to the direction in which the cells extend. The canning structure 370 comprise an exhaust pipe 220, a particulate filter 1 housed in the exhaust pipe 220, and a buffer mat 210 interposed between an inner surface of the exhaust pipe 220 and the low thermal conductive layer 120 for holding the particulate filter 1 in the exhaust pipe.

The outer peripheral coat layer 114 of the canning structure 370 has a coaxial circular concave portion 109a1 at the center of the pillar-shaped honeycomb structure portion 100 in the height direction (the direction in which the cells extend). The concave portion 109a1 is covered with a thin, minimum thickness outer peripheral coat layer. The coaxial circular convex portions 109b are formed adjacent to the first end face 104 side and the second end face 106 side of the concave portion 109a1, respectively, and the convex portions 109b are covered with the low thermal conductive layer 120. Since an outer peripheral coat layer is not formed at the convex portion 109b, the low thermal conductive layer 120 also serves as a gas seal. The portion where the buffer mat 210 contacts the particulate filter 1 is only on the outer surface of the low thermal conductive layer 120. In the portion where the concave portion 109a1 is formed on the outer peripheral side surface 102 of the honeycomb structure portion 100, a gap is formed between the outer peripheral side surface 102 of the honeycomb structure portion 100 and the outer peripheral side members. With this configuration, the area where the particulate filter 1 contacts the outer peripheral side members is reduced, and the heat insulation performance can be improved.

FIG. 3-8 shows a schematic cross-sectional view of a canning structure 380 according to the eighth embodiment of the present invention when observed from a cross section parallel to the direction in which the cells extend. The canning structure 380 comprise an exhaust pipe 220, a particulate filter 1 housed in the exhaust pipe 220, and a buffer mat 210 interposed between an inner surface of the exhaust pipe 220 and the low thermal conductive layer 120 for holding the particulate filter 1 in the exhaust pipe.

The outer peripheral side surface 102 of the canning structure 380 has three coaxial circular convex portions 109b and two coaxial circular concave portions 109a1, which are formed in the height direction (the direction in which the cells extend) of the pillar-shaped honeycomb structure portion 100, alternately and adjacently in the order of convex portion, concave portion, convex portion, concave portion, and convex portion. The convex portions 109b are covered with the thermal conductive layer 120. Since an outer peripheral coat layer is not formed at the convex portion 109b, the low thermal conductive layer 120 also serves as a gas seal. The portion where the buffer mat 210 contacts the particulate filter 1 is only on the outer surface of the low thermal conductive layer 120. In the portion where the concave portions 109a1 are formed on the outer peripheral side surface 102 of the honeycomb structure portion 100, a gap is formed between the outer peripheral side surface 102 of the honeycomb structure portion 100 and the outer peripheral side members. The concave portion 109a1 is covered with a thin, minimum thickness outer peripheral coat layer. With this configuration, the area where the particulate filter 1 contacts the outer peripheral side members is reduced, and the heat insulation performance can be improved.

FIG. 3-9 shows a schematic cross-sectional view of a canning structure 390 according to the ninth embodiment of the present invention when observed from a cross section parallel to the direction in which the cells extend. The canning structure 390 is different from the canning structure 360A shown in FIG. 3-6A in that the outer peripheral coat layer 114 is formed on the entire outer peripheral side surface of the pillar-shaped honeycomb structure portion 100. Further, the canning structure 390 also differs from the canning structure 360A shown in FIG. 3-6A in that a plurality of segments 100a each having a pillar-shaped honeycomb structure portion are joined and integrated together by joining the side surfaces thereof with the joining material 107. Other configurations of the canning structure 390 are the same as those of the canning structure 360A shown in FIG. 3-6A.

FIG. 3-10 shows a schematic cross-sectional view of a canning structure 400 according to the tenth embodiment of the present invention when observed from a cross section parallel to the direction in which the cells extend. The canning structure 400 is different from the canning structure 370 shown in FIG. 3-7 in that the outer peripheral coat layer 114 is formed on the entire outer peripheral side surface of the pillar-shaped honeycomb structure portion 100. Further, the canning structure 400 also differs from the canning structure 370 shown in FIG. 3-7 in that a plurality of segments 100a each having a pillar-shaped honeycomb structure portion are joined and integrated together by joining the side surfaces thereof with the joining material 107. Other configurations of the canning structure 400 are the same as those of the canning structure 370 shown in FIG. 3-7.

FIG. 3-11 shows a schematic cross-sectional view of a canning structure 410 according to the eleventh embodiment of the present invention when observed from a cross section parallel to the direction in which the cells extend. The canning structure 410 is different from the canning structure 380 shown in FIG. 3-8 in that the outer peripheral coat layer 114 is formed on the entire outer peripheral side surface of the pillar-shaped honeycomb structure portion 100. Further, the canning structure 410 also differs from the canning structure 380 shown in FIG. 3-8 in that a plurality of segments 100a each having a pillar-shaped honeycomb structure portion are joined and integrated together by joining the side surfaces thereof with the joining material 107. Other configurations of the canning structure 410 are the same as those of the canning structure 380 shown in FIG. 3-8.

(3. Method for Regenerating Particulate Filter)

If the particulate filter continues to be used, soot will gradually accumulate inside the particulate filter and the pressure loss will increase. Therefore, when soot has accumulated above a certain value, it is necessary to remove the soot and regenerate the particulate filter. As a method for removing soot, a method is generally employed in which after the temperature of exhaust gas is raised, high-temperature exhaust gas is caused to flow through the particulate filter to burn off the soot.

The ignition temperature of soot is high, and in order to burn the soot deposited on the particulate filter, it is generally necessary to burn the soot in the presence of an oxygen-containing gas heated to a temperature exceeding 550° C. A higher heating temperature is preferable from the viewpoint of promoting soot combustion, but raising the heating temperature causes problems such as an increase in fuel consumption, an increase in $NO_x$ emission, and dilution of lubricating oil. Therefore, it is desirable that soot can be burned off efficiently at a temperature as low as possible and in a time as short as possible, while the temperature is kept exceeding 550° C. In this regard, according to the particulate filter according to one embodiment of the present invention, the heat dissipation from the outer peripheral side surface is reduced by covering a part or the whole of the outer peripheral side surface of the pillar-shaped honeycomb structure portion with the low thermal conductive layer. As a result, even if low-temperature exhaust gas is used, the filter can be efficiently regenerated in a short time.

The regeneration efficiency η (%) of filter is represented by the following equation.

$$\eta = (m_1 - m_2)/m_1 \times 100 (\%)$$

η: regeneration efficiency
$m_1$: PM deposition weight before regeneration
$m_2$: PM deposition weight after regeneration In addition, since PM other than soot is also trapped in the exhaust gas filter, when calculating the regeneration efficiency, calculation is performed including PM other than soot as well. Further, the above-mentioned $m_1$ and $m_2$ are measured to obtain the regeneration efficiency by measuring the weight $MF_1$ of the filter on which soot is not deposited, the filter weight $MF_2$ on which soot is deposited before regeneration, and the filter weight $MF_3$ after regeneration, respectively, under a dried condition after drying at 200° C. for 1 hour or more and evaporating the water in the catalyst. The calculation is:

$$m_1 = MF_2 - MF_1$$

$$m_2 = MF_3 - MF_1$$

EXAMPLES

Examples for better understanding the present invention and its advantages will be described below, but the present invention is not limited to the examples.

Comparative Example 1

By a publicly known method, a plurality of rectangular parallelepiped firing segments, which had a size of 42 mm×42 mm×140 mm (the direction in which the cells extend) and had a honeycomb structure portion with the cell openings on the end faces are alternately plugged and an outer peripheral side wall surrounding the honeycomb structure portion, were prepared. Next, a segment joined body in which the side surfaces of the plurality of segments were joined to each other was prepared. The outer peripheral portion was ground to a cylindrical column shape with respect to the segment joined body, and a coating material containing the raw material components described in Table 1 was applied to the entire outer peripheral side surface, followed by drying and heat treatment at 600° C. to form the outer peripheral coat layer having the thickness described in Table 1 and thereby to prepare a DPF. In Table 1, acrylic resin particles having an average size of 8 μm were used as a pore forming material. The same acrylic resin particles were used as the pore forming material in other Comparative Examples and Examples.

The specifications of the prepared DPF are as follows.
Material: Made of Si-bonded SiC
Shape: cylindrical
Dimensions: 165 mm in diameter×140 mm in height
Density of cells: 46.5 cells/cm$^2$
Partition wall thickness: 0.305 mm
Cell shape (cross-sectional shape of the cell in a cross-section perpendicular to the direction in which the cell extends): square
Porosity of partition walls[1]: 63%
  [1] The porosity of the partition wall was measured by a mercury intrusion method by sampling a measurement sample cut out with a grindstone from a DPF obtained under the same manufacturing conditions as those in Comparative Example 1.
Thermal conductivity of partition walls[2]: 6 W/m/K
  [2] The thermal conductivity of the partition walls was measured at 25° C. by a steady state method by sampling a measurement sample cut out with a grindstone from a DPF obtained under the same manufacturing conditions as those in Comparative Example 1.
Average pore diameter of partition walls[3]: 18 μm
  [3] The average pore diameter of the partition walls was measured by a mercury intrusion method by sampling a measurement sample cut out with a grindstone from a DPF obtained under the same manufacturing conditions as those in Comparative Example 1.
Structure: segment joined body
Thermal conductivity of outer peripheral coat layer[4]: See Table 1
  [4] The thermal conductivity in the thickness direction of the outer peripheral coat layer was determined by sampling a measurement sample cut out with a grindstone from a DPF obtained under the same manufacturing conditions as those in Comparative Example 1, followed by grinding in the thickness direction, and then measuring at 25° C. by a steady state method using this measurement sample.

The DPF was placed in the exhaust pipe of a 2 L displacement diesel engine with a buffer mat interposed therebetween, and the engine was operated until 24 g of PM was deposited on the DPF. The PM deposition weight was determined from the difference between the filter weight before the PM deposition operation and the filter dry weight after the PM deposition operation.

An engine exhaust gas having an oxygen concentration of 8% by volume (the inlet gas temperature to the DPF was about 560° C.) was flowed at a flow rate of 2.3 Nm$^3$/min for 40 minutes to the DPF on which PM containing soot was deposited by the above procedure, thereby a filter regeneration test was performed. The regeneration efficiency of the filter was measured by the method described above. The results are shown in Table 1.

Example 1

A low thermal conductive layer slurry (viscosity: about 2000 mPa·s) containing the raw material components shown in Table 1 was applied to the entire outer peripheral side surface of the DPF of Comparative Example 1 by a spray injection method, followed by drying and heat treatment at 600° C. As a result, the DPF of Example 1 having the low thermal conductive layer having the thickness shown in Table 1 was obtained. Thereafter, a PM deposition test and a filter regeneration test were performed on the obtained DPF with the low thermal conductive layer under the same conditions as those in Comparative Example 1.

The porosity of the low thermal conductive layer was determined by sampling a measurement sample cut out with a grindstone from a DPF obtained under the same manufacturing conditions as those in Example 1, followed by grinding in the thickness direction, and then measuring by a mercury intrusion method.

The thermal conductivity in the thickness direction of the low thermal conductive layer was determined by sampling a measurement sample cut out with a grindstone from a DPF obtained under the same manufacturing conditions as those in Example 1, followed by grinding in the thickness direction, and then measuring at 25° C. by a steady state method using this measurement sample. The results are shown in Table 1.

Example 2

After grinding the outer peripheral portion to a cylindrical column shape with respect to the segment joined body of Comparative Example 1, without forming an outer peripheral coat layer, a low thermal conductive layer slurry (viscosity: about 2000 mPa·s) containing the raw material components shown in Table 1 was applied to the entire outer peripheral side surface by a dipping method, followed by drying and heat treatment at 600° C. As a result, the DPF of Example 2 having the low thermal conductive layer having the thickness shown in Table 1 was obtained. Thereafter, a PM deposition test and a filter regeneration test were performed on the obtained DPF with the low thermal conductive layer under the same conditions as those in Comparative Example 1. Further, the porosity and the thermal conductivity of the low thermal conductive layer were measured in the same manner as in Example 1. The results are shown in Table 1.

Example 3

After grinding the outer peripheral portion to a cylindrical column shape with respect to the segment joined body of Comparative Example 1, a coating material containing the raw material components described in Table 1 was applied to the entire outer peripheral side surface, followed by drying and heat treatment at 600° C. to form the outer peripheral coat layer having the thickness described in Table 1. Subsequently, two coaxial circular outer peripheral grooves having a width of 38.5 mm and a groove depth shown in Table 1 were formed in the outer peripheral coat layer. At this time, the ratio of the area of the portion provided with the outer peripheral groove to the entire area of the outer surface of the outer peripheral coat layer is shown in Table 1.

Subsequently, a low thermal conductive layer slurry (viscosity: about 2000 mPa·s) containing the raw material components shown in Table 1 was applied to the outer surface of the portion where the outer peripheral grooves were not provided on the outer peripheral coat layer (the convex portion) by a spray applying method, followed by drying and heat treatment at 600° C. As a result, the DPF of Example 3 having the low thermal conductive layer having the thickness shown in Table 1 was obtained. Thereafter, a PM deposition test and a filter regeneration test were performed on the obtained DPF with a low thermal conductive layer under the same conditions as in Comparative Example 1. In addition, the portion where the buffer mat installed in the exhaust pipe contacted the DPF was only on the outer surface of the low thermal conductive layer. Further, the porosity and the thermal conductivity of the low thermal conductive layer were measured in the same manner as in Example 1. The results are shown in Table 1.

Example 4

The outer periphery of the segment joined body of Comparative Example 1 was ground into a cylindrical column shape. Thereafter, without forming an outer peripheral coat layer, two coaxial circular outer peripheral grooves having a width of 38.5 mm and a groove depth shown in Table 1 were formed on the outer peripheral side surface of the segment joined body. At this time, the ratio of the area of the portion provided with the outer peripheral groove to the entire area of the outer peripheral side surface of the segment joined body is shown in Table 1.

Subsequently, a coating material containing the raw material components described in Table 1 was applied to the outer surface of the portion of the outer peripheral side surface of the segment joined body where the outer peripheral grooves were provided (the concave portion), followed by drying and heat treatment at 600° C. to form the outer peripheral coat layer having the thickness described in Table 1. Also, a low thermal conductive layer slurry (viscosity: about 2000 mPa·s) containing the raw material components shown in Table 1 was applied to the outer surface of the portion where the outer peripheral grooves were not provided (the convex portion) by a spray applying method, followed by drying and heat treatment at 600° C. to form the low thermal conductive layer having the thickness described in Table 1. As a result, the DPF of Example 4 having the low thermal conductive layer having the thickness shown in Table 1 was obtained. Thereafter, a PM deposition test and a filter regeneration test were performed on the obtained DPF with a low thermal conductive layer under the same conditions as in Comparative Example 1. In addition, the portion where the buffer mat installed in the exhaust pipe contacted the DPF was only on the outer surface of the low thermal conductive layer. Further, the porosity and the thermal conductivity of the low thermal conductive layer were measured in the same manner as in Example 1. The results are shown in Table 1.

Example 5

The outer periphery of the segment joined body of Comparative Example 1 was ground into a cylindrical column shape. Thereafter, without forming an outer peripheral coat layer, four coaxial circular outer peripheral grooves having the groove depths shown in Table 1 were formed on the outer peripheral side surface of the segment joined body. At this time, the ratio of the area of the portion provided with the outer peripheral groove to the entire area of the outer peripheral side surface of the segment joined body is shown in Table 1.

Next, with both end faces of the segment joined body being masked, the segment joined body was immersed in a low thermal conductive layer slurry (viscosity: about 2000 mPa·s) containing the raw material components shown in Table 1. Next, the segment joined body was put into a dryer and dried at 200° C. (atmosphere environment) for 1 hour. The slurry immersion and the drying were repeated three times. Thereafter, the segment joined body was placed in an electric furnace and fired at 1100° C. (atmosphere environment) for 3 hours. As a result, the DPF of Example 5 having the low thermal conductive layer having the thickness shown in Table 1 was obtained.

Thereafter, a PM deposition test and a filter regeneration test were performed on the obtained DPF with a low thermal conductive layer under the same conditions as in Comparative Example 1. In addition, the portion where the buffer mat installed in the exhaust pipe contacted the DPF was only on the outer surface of the low thermal conductive layer formed in the portion where the outer peripheral grooves were not provided (the convex portion). Further, the porosity and the thermal conductivity of the low thermal conductive layer were measured in the same manner as in Example 1. The results are shown in Table 1.

Example 6

The DPF of Example 6 was produced according to the same procedure as in Example 5 except that plate-shaped alumina particles (average size in the longitudinal direction: 2 μm, average aspect ratio: 5.0) were used instead of the spherical alumina particles as components of the low heat conductive layer slurry. Thereafter, a PM deposition test and a filter regeneration test were performed on the obtained DPF with a low thermal conductive layer under the same conditions as in Comparative Example 1. In addition, the portion where the buffer mat installed in the exhaust pipe contacted the DPF was only on the outer surface of the low thermal conductive layer formed in the portion where the outer peripheral grooves were not provided. Further, the porosity and the thermal conductivity of the low thermal conductive layer were measured in the same manner as in Example 1. The results are shown in Table 1.

TABLE 1

| | | Outer peripheral coat layer | | | |
| --- | --- | --- | --- | --- | --- |
| | | Outer peripheral coat layer forming portion | Raw material components for outer peripheral coat layer (mass %) | Outer peripheral coating material thermal conductivity (W/mK) | Outer peripheral coat layer thickness (mm) |
| Comparative Example 1 | | Outer peripheral side surface of segment joined body | <Solid content> SiC particles: 50% Colloidal silica: 30% Alumina fiber: 10% Pore forming material: 5% Organic binder: 5% <Solvent> Water: 100 parts by mass per 100 parts by mass of solid content | 2 | 0.5 |

TABLE 1-continued

| | | | | |
|---|---|---|---|---|
| Example 1 | Outer peripheral side surface of segment joined body | Same as Comparative Example 1 | 2 | 0.5 |
| Example 2 | None | None | None | None |
| Example 3 | Outer peripheral side surface of segment joined body | Same as Comparative Example 1 | 2 | 2 |
| Example 4 | Only concave portion of outer peripheral side surface of segment joined body | Same as Comparative Example 1 | 2 | About 0.2 |
| Example 5 | None | None | None | None |
| Example 6 | None | None | None | None |

| | Low thermal conductive layer | | | |
|---|---|---|---|---|
| | Raw material components for low thermal conductive layer (mass %) | Low thermal conductive layer forming portion | Low thermal conductive layer thickness (mm) | Low thermal conductive layer porosity (%) | Low thermal conductive layer thermal conductivity (W/mK) |
| Comparative Example 1 | None | None | None | None | None |
| Example 1 | <Solid content><br>Spherical zirconia particles (average size 3 μm): 25%<br>Spherical cordierite scrap particles (average size 6 μm): 25%<br>Alumina fiber (average length 140 μm): 10%<br>Colloidal silica: 30%<br>Porous material: 5%<br>Organic binder: 5%<br><Solvent><br>Water: 100 parts by mass per 100 parts by mass of solid content | Entire surface of outer peripheral coat layer | 1 | 60 | 0.3 |
| Example 2 | Same as Example 1 | Entire outer peripheral side surface of segment joined body | 1.5 | 60 | 0.3 |
| Example 3 | Same as Example 1 | Convex portion of outer peripheral coat layer | 1 | 60 | 0.3 |
| Example 4 | Same as Example 1 | Convex portion of segment joined body | 1 | 60 | 0.3 |
| Example 5 | <Solid content><br>Spherical alumina particles (average size 6 μm): 15%<br>Spherical titania particles (average size 0.25 μm): 15%<br>Alumina fiber (average fiber length 140 μm): 10%<br>Pore forming material: 5%<br>Inorganic binder: 50%<br>Organic binder: 5%<br><Solvent><br>Ethanol: 100 parts by mass per 100 parts by mass of solid content | Entire outer peripheral side surface of segment joined body | 1 | 60 | 0.6 |
| Example 6 | Same as Example 5 except that plate-shaped alumina particles were used instead of spherical alumina particles | Entire outer peripheral side surface of segment joined body | 1 | 60 | 0.2 |

TABLE 1-continued

|  | Outer peripheral groove | | | |
|---|---|---|---|---|
|  | Outer peripheral groove forming portion | Outer peripheral groove area/total outer peripheral area ratio (%) | Outer peripheral groove depth (mm) | Regeneration efficiency (%) |
| Comparative Example 1 | None | None | None | 42 |
| Example 1 | None | None | None | 55 |
| Example 2 | None | None | None | 60 |
| Example 3 | Outer peripheral coat layer | 55 | 1 | 67 |
| Example 4 | Outer peripheral side surface of segment joined body | 55 | 1 | 70 |
| Example 5 | Outer peripheral side surface of segment joined body | 55 | 1 | 68 |
| Example 6 | Outer peripheral side surface of segment joined body | 55 | 1 | 73 |

DISCUSSION

From Table 1, it can be understood that the filter regeneration efficiency of the DPF in which the low heat conductive layer was formed on the outer peripheral side surface was significantly improved. Further, it can be understood that the filter regeneration efficiency was further improved by providing the outer peripheral groove and providing the gap (insulating air layer). Further, it can also be understood that the filter regeneration efficiency was further improved by the low thermal conductive layer containing the plate-shaped alumina particles.

DESCRIPTION OF REFERENCE NUMERALS

1 Particulate filter
100 Honeycomb structure portion
100a segment
102 Outer peripheral side surface
104 First end face
106 Second end face
107 Joining material
108 First cell
109a1 Coaxial circular concave portion
109a2 Concave portion extending parallel to central axis
109b Convex portion
110 Second cell
112 Partition wall
114 Outer peripheral coat layer
120 Low thermal conductive layer
210 Buffer mat
220 Exhaust pipe
310, 320, 330, 340, 350, 360A, 360B, 370, 380, 390, 400, 410 Canning structure

The invention claimed is:
1. A particulate filter, comprising:
a pillar-shaped honeycomb structure portion having a plurality of first cells extending from a first end face to a second end face, the first end face being open and the second end face being plugged, and a plurality of second cells extending from the first end face to the second end face, the first end face being plugged and the second end face being open, in which the first cells and the second cells are alternately arranged adjacent to each other with porous partition walls interposed therebetween; and
a low thermal conductive layer covering a part or the whole of an outer peripheral side surface of the pillar-shaped honeycomb structure portion, the thermal conductivity in a thickness direction of the low thermal conductive layer being 0.1 W/(m·K) or more and 0.6 W/(m·K) or less.
2. The particulate filter according to claim 1, wherein a thickness of the low thermal conductive layer is 0.5 mm or more.
3. The particulate filter according to claim 1, wherein the low thermal conductive layer has one or more regions covering a part of the outer peripheral side surface of the pillar-shaped honeycomb structure portion.
4. The particulate filter according to claim 3, wherein a proportion of an area of the part covered by the low thermal conductive layer on the outer peripheral side surface of the pillar-shaped honeycomb structure portion is 30% to 100%.
5. The particulate filter according to claim 1, wherein the low thermal conductive layer is an inorganic porous layer having a porosity of 40% or more and contains ceramic particles.
6. The particulate filter according to claim 5, wherein the ceramic particles comprise one or both of plate-shaped ceramic particles and needle-shaped ceramic particles.
7. The particulate filter according to claim 5, wherein the low thermal conductive layer further contains ceramic fibers.
8. The particulate filter according to claim 1, wherein the low thermal conductive layer comprises one or more selected from a group consisting of alumina particles, $SiO_2$ glass particles, zirconia particles, cordierite scrap particles, and titania particles.
9. The particulate filter according to claim 1, wherein the thickness of the low thermal conductive layer is 0.5 mm or more and 5 mm or less.
10. The particulate filter according to claim 1, wherein the thermal conductivity of the low thermal conductive layer is 0.4 W/(m·K) or less.

11. The particulate filter according to claim 1, wherein the pillar-shaped honeycomb structure portion comprises as a main component any one selected from a group consisting of cordierite, mullite, aluminum titanate, silicon carbide, Si-bonded SiC, and silicon nitride.

12. The particulate filter according to claim 1, wherein at least an outer surface of the low thermal conductive layer has been subjected to a hydrophobic treatment.

13. The particulate filter according to claim 12, wherein at least the outer surface of the low thermal conductive layer is coated with a hydrophobic resin.

14. A canning structure, comprising:
   an exhaust pipe;
   a particulate filter according to claim 1 housed in the exhaust pipe; and
   a buffer mat interposed between an inner surface of the exhaust pipe and the low thermal conductive layer of the particulate filter for holding the particulate filter in the exhaust pipe.

15. The canning structure according to claim 14, wherein a portion where the buffer mat comes into contact with the particulate filter is only on the outer surface of the low thermal conductive layer.

\* \* \* \* \*